United States Patent
Deshmukh et al.

(10) Patent No.: US 12,550,000 B2
(45) Date of Patent: Feb. 10, 2026

(54) METHOD AND APPARATUS FOR HANDLING SEGMENTATION IN A WIRELESS COMMUNICATION

(71) Applicant: Samsung Electronics Co., Ltd., Suwon-si (KR)

(72) Inventors: Aneesh Narendra Deshmukh, Bangalore (IN); Nayan Ostwal, Bangalore (IN); Neha Sharma, Bangalore (IN); Mahantesh Kothiwale, Bangalore (IN); Anshuman Nigam, Bangalore (IN); Mayank Sonu, Bangalore (IN); Jiyoung Cha, Suwon-si (KR); Dongmyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 18/407,766

(22) Filed: Jan. 9, 2024

(65) Prior Publication Data
US 2024/0267790 A1    Aug. 8, 2024

(30) Foreign Application Priority Data
Jan. 31, 2023 (IN) .............................. 202341006065

(51) Int. Cl.
G06F 15/173 (2006.01)
H04W 28/06 (2009.01)
(52) U.S. Cl.
CPC ................................. *H04W 28/065* (2013.01)
(58) Field of Classification Search
CPC .................................................. H04W 28/065
See application file for complete search history.

(56) References Cited

U.S. PATENT DOCUMENTS

| 9,756,680 B2 | 9/2017 | Wang et al. |
| 2009/0059853 A1 | 3/2009 | Kim et al. |

(Continued)

FOREIGN PATENT DOCUMENTS

| EP | 3668062 A1 | 6/2020 |

OTHER PUBLICATIONS

International Search Report dated Apr. 22, 2024, issued in International Patent Application No. PCT/KR2024/000387.

*Primary Examiner* — Yves Dalencourt
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). A method for handling segmentation in a converged layer 2 (L2) communication network is provided. The method includes assigning, by a converged L2 of a transmitter, a L2 sequence number (SN) to a protocol data unit (PDU). The L2 SN includes at least one of a last segment indication (LSI) indicating a presence of a last service data units (SDU) of the complete PDU, a length indicator exist (LIE) indicating a presence of a length indicator (LI) after a L2 header, or a SI indicating a segmentation status or stage of the complete PDU, receiving, by a medium access control (MAC) layer of the transmitter, a grant opportunity or a transmission opportunity for transferring the PDU available at the converged L2, and sending the PDU to a lower layer of the transmitter for transmission to a receiver with or without segmentation based on the grant or a transmission opportunity.

20 Claims, 18 Drawing Sheets

(56) References Cited

U.S. PATENT DOCUMENTS

| | | | |
|---|---|---|---|
| 2009/0092138 A1* | 4/2009 | Joo | H04W 28/065 370/392 |
| 2018/0097918 A1 | 4/2018 | Nuggehalli et al. | |
| 2018/0132279 A1* | 5/2018 | Yi | H04W 28/0294 |
| 2018/0302823 A1* | 10/2018 | Cho | H04W 28/065 |
| 2019/0174575 A1* | 6/2019 | Shah | H04W 80/08 |
| 2022/0369367 A1* | 11/2022 | Lee | H04W 72/0446 |

* cited by examiner

METHOD AND APPARATUS FOR HANDLING SEGMENTATION IN A WIRELESS COMMUNICATION

CROSS-REFERENCE TO RELATED APPLICATION(S)

This application is based on and claims priority under 35 U.S.C. § 119(a) of an Indian Provisional patent application number 202341006065, filed on Jan. 31, 2023, in the Indian Intellectual Property Office, and of an Indian Complete patent application number 202341006065, filed on Dec. 1, 2023, in the Indian Intellectual Property Office, the disclosure of each of which is incorporated by reference herein in its entirety.

BACKGROUND

1. Field

The disclosure relates to a wireless communication networking. More particularly, the disclosure relates to a transmitter and a method for optimizing layer 2 segmentation handling processing and mechanism in a fifth generation (5G) data plane/sixth generation (6G) data plane.

2. Description of Related Art

Considering the development of wireless communication from generation to generation, the technologies have been developed mainly for services targeting humans, such as voice calls, multimedia services, and data services. Following the commercialization of 5G communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies, such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems, a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations, and the like and enabling network operation optimization and automation, and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services, such as truly immersive extended reality (XR), high-fidelity mobile hologram, and digital replica could be provided through 6G communication systems. In addition, services, such as remote surgery for security and reliability enhancement, industrial automation, and emergency response will be provided through the 6G communication system such that the technologies could be applied in various fields, such as industry, medical care, automobiles, and home appliances.

Several broadband wireless technologies have been developed to meet the growing number of broadband subscribers for providing better applications and services. In an example, a second generation wireless communication system has been developed to provide voice services while ensuring the mobility of users. A third generation wireless communication system supports not only the voice service but also a data service. A fourth wireless communication system has been developed to provide high-speed data service. However, currently, the fourth generation (4G) or a long term evolution (LTE) communication system suffers from a lack of resources to meet the growing demand for high-speed data services. The issue is addressed by the deployment of a fifth generation wireless communication system to meet the ever growing demand for the high speed data services. Further, the fifth generation (5G) wireless communication system or a new radio (NR) wireless communication system provides ultra-reliability and supports low latency applications.

With the advent of further increase in a data demand, high bandwidth, processing capability, a next generation wireless communication systems i.e., beyond the 5G wireless communication system and a sixth generation (6G) wireless communication system should be capable to meet such ever-increasing requirements.

In the LTE communication system, protocols that exist for a user plane including a packet data convergence protocol (PDCP) layer, a radio link control (RLC) layer, a medium access control (MAC) layer, and a physical (PHY) protocol layer. A control plane stack additionally includes a radio resource control (RRC) and a non-access stratum (NAS). The RLC layer exists in a user equipment (UE) & eNodeB. The RLC layer is a part of LTE air interface control and data planes. The main functionalities of the RLC layer for the LTE communication system are:

Error correction mechanism through an Automatic Repeat Request (ARQ).
In-order delivery mechanism.
Concatenation mechanism.
Segmentation & Reassembly mechanism.
Reordering mechanism FIG. 1 illustrates a data plane 100 in a LTE (or 4G) for packet processing according to the related art.

Referring to FIG. 1, in LTE communication system (or 4G communication system), packets received from the PDCP layer are concatenated at the RLC layer. After that, a RLC sequence number (SN) is assigned to a RLC protocol data unit (PDU) only after a grant reception. The grant reception is a transmission opportunity provided by a network to the UE in the form of number of bytes to be transferred. One RLC PDU consisted of a variable number of RLC service data units (SDUs). For example, 1 RLC SDU is equal to 1 PDCP PDU. Each PDCP PDU had 1 PDCP SN. During segmentation, the PDCP SDU typically gets fragmented. A new RLC SN is assigned to the remaining PDCP fragment during the next transmission opportunity. The pre-processing for the RLC is not possible for 4G as the number of RLC SDUs to be packed is dependent on the grant size. However, due to the variable number of PDCP Packets in RLC PDU, the RLC header is variable in size. With low throughput requirement and concatenation at RLC, the number of RLC SN needed are less. RLC SN range is just 10-bit number 1024.

FIG. 2 illustrates a data plane 200 in a NR (or 5G) for packet processing according to the related art.

Referring to FIG. 2, the 5G wireless communication system allows pre-processing and introduce fixed size RLC header. In the 5G wireless communication system, the RLC SN is allocated to every RLC SDU. Real time processing is limited to only segmentation at the RLC layer where if a complete RLC SDU cannot be packed in a MAC transport block (TB). The RLC segment header for the first segment is of the same size as the RLC complete header size, with just 1 bit difference and hence allows for the efficient segmentation handling. However, each RLC PDU is assigned a MAC sub-header and hence the number of headers required are larger as compared to the LTE, but pre-processing helps in faster processing of the packet. The number of RLC SNs required is large and supported up to 18-bit SN i.e., 262144.

When the RLC layer receives the grants from the lower layer, a transmitter entity concatenates multiple PDCP PDUs into an RLC protocol data unit (PDU) and assigns one RLC sequence number (SN) for an RLC PDU as shown in FIG. 1.

FIG. 3 illustrates a sample header structure 300 in an LTE (or 4G) for a RLC layer according to the related art.

Referring to FIG. 3, FI indicates a Framing Info field. The Framing Info field is updated to inform whether a first byte and a last byte of the RLC PDU corresponds to the first byte and the last byte of an RLC SDU respectively.

E indicates extension field. The extension field indicates whether a data field follows to indicate the end of the header or another extension follows or not i.e., a set of E field and length indicator (LI) field follows.

LI indicates length indicator Field. The length indicator Field indicates the length of the RLC SDU.

In 4G, E and LI field is not updated for the last concatenated PDCP PDU.

An important aspect of a modem protocol solution is to also adopt to the fluctuating channel conditions, which results in varying grants, thus the size of the transport block (TB) keeps varying with time. Hence, the available packets need to be adjusted, typically truncated to meet the transmission opportunity or the grant size available. In such case, the modem protocol processing also tries to pack in the best possible way.

In LTE (or 4G), a single RLC SN is assigned when grants are available from the media access control (MAC) and single RLC SN maps to multiple PDCP PDUs because of concatenation of PDCP PDUs. The RLC PDU is prepared only after receiving of grant as no part of RLC PDU is possible to be pre-processed, i.e., prepared before the grant is received. Based on the available grant size, the RLC PDU packs the PDCP SDUs using framing information (FI) field in the LTE Header. Based on what portion of the PDCP SDU is getting packed or fragmented, the two consecutive bits of the FI field are updated based on whether the first byte of RLC PDU is the first byte of any PDCP SDU, indicating a complete SDU, corresponding to the first bit of FI field. Similarly, if the last byte of the RLC PDU is the last byte of any PDCP SDU to indicate a complete PDCP SDU at the end is indicated by the second bit of the FI field. If RLC PDU(s) are lost for the first time because of BLER, the status report generated only needs to report completely missed RLC SNs. Now when a NACKed RLC SN is retransmitted in case of fewer grants available, an advanced micro device (AMD) PDU segment is sent which is indicated using re-segmentation flag (RF) in the header. The RLC header in LTE give rise to various issues, for example, but not limited to, Multiple header types lead to variable size of RLC header.

As the number of PDCP PDUs to be packed cannot be known before a complete RLC header can be prepared only after receiving grants. Hence, the LI field in the RLC header structure can be updated only after grant. In addition, the FI information tells the first and the last byte of the RLC PDU whether it contains a complete PDCP SDU or not.

In case of re-segmentation in case of retransmission of the NACKed RLC SN, the RLC Header needs to be updated to include the re-segmentation flag (RF), last segment flag (LSF) and segment offset (SO) field and re-fill the LI information based on the number of PDCP PDUs getting concatenated during re-segmentation.

The length of the last PDCP PDU included in the concatenated RLC PDU has to be computed by subtracting RLC PDU LI fields for other PDCP PDUs from the total MAC PDU Length.

Thus, it can be gathered that LTE (4G) RLC Header yields the aforementioned problems by having a Variable size RLC Header, Multiple RLC fields like FI, LI for packing incomplete PDCP SDU, Difference in segmentation and re-segmentation handling, and No pre-processing of RLC.

FIG. 4 illustrates a sample header structure 400 in a NR (or 5G) for an RLC layer according to the related art. The main functionalities of the RLC layer for NR (5G) are:

Error correction mechanism through the ARQ,

In-order delivery mechanism,

Segmentation & Reassembly mechanism, and

Reordering mechanism.

Thus, the RLC layer for the NR (5G) lack a concatenation mechanism. The actual concatenation of the packets happen in the MAC based on grant received for that transport block (TB) transmission. Thus, without concatenation mechanism, single RLC SN maps to single RLC SDU i.e., one PDCP PDU, and hence, this is extremely advantageous in terms of pre-processing as it is independent of grant reception.

Referring to FIG. 4, SI indicates segmentation info field. The Segmentation Info Field indicates whether an RLC PDU contains a complete RLC SDU or the first, middle, last segment of an RLC SDU.

A segmentation offset field (SO) indicates a position of the RLC SDU segment in bytes within the original RLC SDU. In case of segmentation, in case of no grants, for the first segment, SI field is enough to indicate the first segment as SO=0 is redundant.

The advantages of the NR (5G) RLC Header can be listed as:

NR (5G) RLC header is of fixed size.

Single RLC SN is assigned to a single PDCP PDU.

RLC Header can be prepared even before grant update operation.

Segmentation Information can be easily filled without much changes to the already pre-processed RLC complete PDU Header as only SI bit needs to be updated for the first Segment to be transferred.

During segmentation or re-segmentation, RLC has just to prepare an RLC Segment Header with the SO field.

Thus, it can be gathered that NR (5G) RLC Header provides at least a fixed size RLC Header, already pre-processed RLC and efficient segment information is packed in the RLC Header. On the other hand, NR (5G) RLC Header yields various issues and challenges, such as:

In NR (5G) RLC mechanism, large number of RLC SN is required for window maintenance as single RLC SN gets mapped to single PDCP SN. Further, the processing cycle at the receiver increases due to extra sequence numbers and creates bottleneck in terms of processing high throughput.

For every grant, MAC has to prepare multiple MAC sub headers, as MAC sub header capture the Length of the RLC PDU information thus resulting in extra overhead for packet transfer in terms of communication headers and payload.

Length of each RLC PDU or RLC PDU segment is packed with MAC Sub-Header.

Further, with the advent of further increase in data demand, high bandwidth, processing capability, it is very much viable that a future modem communication protocol system, particularly in system beyond 5G system/6G system, would be having a huge requirement for high speed data processing. All applications like high definition video streaming, augmented reality (AR)/virtual reality (VR), holography and digital twin require dedicated processing and stringent Key performance index (KPI) requirements related to high throughput, low latency and zero jitter all met simultaneously. In such highly-interactive immersive application, there is fundamentally no practical difference between a lost packet and a late packet because of the synchronization required for multiple streams of these applications.

All the legacy protocol stack design is focused on lossless data delivery making them unsuitable for such highly-interactive immersive application. Further, legacy protocols have layered processing which involves significant processing at each layer. At adjacent layers like PDCP and RLC, there exist duplicate functionalities like windowing, reordering, status report, or the like, making few functionalities redundant in some scenarios. Thus, it is required to simplify the processing by removing these redundancies across the complete protocol stack. In addition, with an increased number of packets to be processed in a shortened transmission time interval (TTI), there is a need to improve the data plane processing capability in various aspects in order to achieve extremely fast processing. Recently, there have been many approaches to improving multi core architecture designs.

However, the current state of the art techniques needs to be simplified and fasten the overhead of processing functionalities for future generation protocol by providing a reliable communication mechanism for the application and transport layers as well. Further, the current functionality of recovery at the RLC layer is typically to overcome a portion of residual loss from the MAC layer. The MAC layer also has hybrid automatic repeat request (HARQ) procedure to attempt recovery at subsequent retransmissions. The higher protocol layers in 4G or 5G focus on lossless in-order packet delivery to overcome a residual MAC PDU loss, but at the cost of processing for recovery and subsequent round-trip delays added for recoveries. Moreover, due the nature of the varying channel conditions, segmentation or varying grants can never be avoided. Further the packet sizes for different applications is very different and hence, there is no fixed packet size coming from the upper layers. Thus, it cannot be pre-decided on how many packets can really fit in the protocol PDU. Apart from all the processing, the most important real time processing decision to be taken in terms of modem processing is segmentation or adjusting the packets as per the transmission block size or the grant size. Rest most of the processing can be done in non-real time or soft-real time in nature. Hence, simplifying the procedure is necessary to achieve the next-generation application performance without complicating the existing procedures. Simplification, optimization and convergence is a necessity for ensuring a very simple way of handling the protocol segmentation. With a converged Layer 2 operation, having segmentation handling in the most simples of way is a necessity to achieve the important KPIs for next generation communication technology.

FIG. 5 illustrates a comparison 500 between packet handling at PDCP, RLC between LTE (4G) and NR (5G), according to the related art. For example, in LTE and NR, the PDCP SDU processing is very similar, which indicates that a PDCP SN is assigned to every packet being processed at PDCP layer. The main differences arise in handling these packets at RLC layer.

Referring to FIG. 5, for LTE, the RLC operations are likely performed after grants reception. RLC protocol data unit (PDU) is formed only after grant is received and it packs as many PDCP PDUs or portion of PDCP PDUs which meet the available grants. Hence, a single RLC SN is assigned to multiple PDCP PDUs or partial PDCP PDU based on available grant. Hence, both fragmentation and concatenation is performed at RLC layer. Accordingly, the RLC Header indicates various fields, such as FI, LSF, LI to indicate the packed PDCP PDUs in the RLC PDU. Whereas, for NR, there involves a one-to-one mapping between RLC SN and PDCP SN and hence, RLC pre-processing can be performed to form individual RLC PDUs even before receiving grants. Only when grants are received, the RLC PDUs are concatenated at MAC and only the RLC PDUs for which segmentation takes place are updated while concatenating in MAC.

In other words, next generation immersive applications having strict KPI requirements in terms of latency, throughput and jitter might require a stricter and simpler packet processing in order to increase desired user experience. As per the 3GPP NR specification, a typical modem handles IP packets from various applications. The size of these packets being handled is of varying size from few 10s of bytes to 1000s of bytes. Maximum size of IP packet can be up to 9 k bytes due to Ethernet jumbo frame size limitation. The packets are then processed one by one at each layer, where 1 IP packet=1 PDCP SDU=1 PDCP PDU with 1 PDCP SN=1 RLC SDU=1 RLC PDU with 1 RLC SN. At MAC layer, based on the grant (i.e., the size of the transport block (TB) which can be sent over the PHY layer in one transmission opportunity) received, multiple RLC PDUs in one MAC TB are sent over PHY in real time. The MAC layer does the concatenation of multiple RLC PDUs, from the same or different bearers, into single MAC TB. Due to the nature of the mapping between an IP packet, PDCP SDU, RLC PDU, NR allows for a lot of packet header preparation to be pre-processed, implying that PDCP Headers, RLC Headers and to some extent MAC sub-Headers for Data Path can be prepared even before getting grants from lower layer.

Further, grants are received in terms of bytes and grants are allocated for the entire UE. Thus, on reception of grant, the MAC layer has to decide on scheduling of the received grants to different RBs, and based on the grant allocated, respective RLC layer can pack its PDUs and deliver those to MAC. In addition, it is important that MAC needs to pack complete data based on availability. The legacy methods do take into account together both pre-processing of layer 2 (L2) headers and chaining of SDUs.

In order to achieve the aforementioned requirements, a communication protocol for modem should provide at least, give a very simple way of segmentation handling on top of the lean protocol handling for data plane packets.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a transmitter for handling segmentation in a converged layer 2 (L2) communication network.

Another aspect of the disclosure is to receive a plurality of service data units (SDUs) using an upper layer of the transmitter.

Another aspect of the disclosure is to concatenate a plurality of SDUs received from the upper layer to obtain a protocol data unit (PDU) using a converged L2 of the transmitter.

Another aspect of the disclosure is to assign a L2 sequence number (SN) to the PDU using the converged L2 of the transmitter. The L2 SN includes at least one of a last SDU indicator (LSI) indicating a presence of a last SDU of the complete PDU, a length indicator exist (LIE) indicating a presence of a length indicator (LI) after a L2 header, or a segment indication (SI) indicating a segmentation status or stage of the complete PDU.

Another aspect of the disclosure is to receive a grant opportunity or a transmission opportunity for transferring the PDU available at the converged L2 using a MAC layer of the transmitter.

Another aspect of the disclosure is to send the PDU to a lower layer of the transmitter for transmission to a receiver with or without segmentation based on the grant or a transmission opportunity using the MAC layer of the transmitter.

Another aspect of the disclosure is to manage a segmentation efficiently for a real-time requirement and still manage a complete pre-processing of a layer-2 in a non-real-time scenario for a converged layer 2 scenario.

Additional aspects will be set forth in part in the description which follows and, in part, will be apparent from the description, or may be learned by practice of the presented embodiments.

In accordance with an aspect of the disclosure, a method for handling segmentation in a converged L2 communication network is provided. The method includes receiving, by an upper layer of a transmitter, a plurality of service data units (SDUs), concatenating by a converged L2 of the transmitter, plurality of SDUs received from the upper layer to obtain a PDU, assigning by the converged L2 of the transmitter, a L2 sequence number (SN) to the PDU, where the L2 SN includes at least one of a last SDU indicator (LSI) indicating a presence of a last SDU of the complete PDU, a length indicator exist (LIE) indicating a presence of a length indicator (LI) after a L2 header, or a segment indication (SI) indicating a segmentation status or stage of the complete PDU, receiving, by a MAC layer of the transmitter, a grant opportunity or a transmission opportunity for transferring the PDU available at the converged L2, and sending, by the MAC layer of the transmitter, the PDU to a lower layer of the transmitter for transmission to a receiver with or without segmentation based on the grant or a transmission opportunity.

In an embodiment of the disclosure, the method further includes sending, by the MAC layer of the transmitter, the PDU to the lower layer of the transmitter for transmission to the receiver with or without segmentation based on the grant opportunity or the transmission opportunity includes determining, by the MAC layer of the transmitter, whether the grant opportunity or the transmission opportunity is enough to send a complete PDU to the receiver, and performing, by the MAC layer of the transmitter, one of, sending the complete PDU to a lower layer of the transmitter for transmission to the receiver without segmentation based on the grant opportunity or the transmission opportunity, when the grant opportunity is enough to send the complete PDU, segmenting the complete PDU into a plurality of PDU segments based on the grant opportunity or the transmission opportunity, or sending the plurality of PDU segments to a lower layer of the transmitter for transmission to the receiver, when the grant opportunity or the transmission opportunity is not enough to send the complete PDU.

In an embodiment of the disclosure, the method further includes sending the plurality of PDU segments to a lower layer of the transmitter for transmission to the receiver includes creating, by the MAC layer of the transmitter, a segment header for each PDU segment of the plurality of PDU segments based on the grant opportunity or the transmission opportunity, assigning by the MAC layer of the transmitter, an identifier field with the same L2 SN to each PDU segment in the segment header, where the L2 SN includes a segmentation offset (SO) field, where the SO field indicates offset from a first byte of a payload, creating, by the MAC layer of the transmitter, a MAC PDU by assigning a MAC sub header to the plurality of PDU segments of the complete PDU, and sending by the MAC layer of the transmitter, the MAC PDU to the lower layer of the transmitter for transmission to the receiver.

In an embodiment of the disclosure, the method further includes sending by the MAC layer of the transmitter, the MAC PDU to the lower layer of the transmitter for transmission to the receiver includes determining, by the MAC layer of the transmitter, whether the grant opportunity or the transmission opportunity is enough to send the original LI in TTIs, and performing, by the MAC layer, one of, sending the original LI in all payloads of the PDU segments of the MAC PDU in subsequent TTIs, when the grant opportunity or the transmission opportunity is enough to send the original LI in the subsequent TTIs, or sending the truncated LI only for the portion of the SDU which is present in the PDU segments of the MAC PDU after segmentation.

In an embodiment of the disclosure, the identifier field for the PDU segments in a same L2 header, the same L2 SN is assigned for all the PDU segments of the complete PDU.

In an embodiment of the disclosure, the method further includes sending the complete PDU to the lower layer of the transmitter for transmission to the receiver without segmentation based on the grant opportunity or the transmission opportunity includes creating, by the MAC layer of the transmitter, a MAC PDU by assigning a SI indicating that the complete PDU is not segmented, a LSI indicating that the complete PDU includes the last SDU which was concatenated to form by the completed PDU at the converged L2, and a LIE indicating a presence of a length Indicator as a L2 Sub Header including an LI field for the plurality of SDUs, and sending by the MAC layer of the transmitter, the MAC PDU to the lower layer of the transmitter for transmission to the receiver.

In an embodiment of the disclosure, the LSI is set to one when the SI indicates the last SDU of the complete PDU, otherwise set to zero.

In an embodiment of the disclosure, the LIE is set to one when the LI exist following the L2 Header, otherwise set to zero.

In an embodiment of the disclosure, the concatenation of the plurality of SDUs to form a complete PDU is done in non-real time (NTR). The segmentation is performed in real time (RT) by a layer between the converged L2 and the MAC layer or by a MAC layer using same SN as the packet at converged Layer 2 or a new identifier at MAC layer or a new layer between the Converged L2 and MAC layer.

In accordance with another aspect of the disclosure, a transmitter for handling segmentation in wireless networks is provided. The transmitter includes a converged layer 2 communication controller, one or more processors, and memory storing one or more computer programs including computer-executable instructions that, when executed by the one or more processors, cause the transmitter to receive a plurality of SDUs using an upper layer of the transmitter, concatenate plurality of SDUs received from the upper layer to obtain a PDU using a converged L2 of the transmitter, assign a L2 SN to the PDU using the converged L2 of the transmitter, where the L2 SN includes at least one of a LSI indicating a presence of a last SDU of the complete PDU, a LIE indicating a presence of a LI after a L2 header, or a SI indicating a segmentation status or stage of the complete PDU, receive a grant opportunity or a transmission opportunity for transferring the PDU available at the converged L2 using a MAC layer of the transmitter, and send the PDU to a lower layer of the transmitter for transmission to a receiver with or without segmentation based on the grant or a transmission opportunity using the MAC layer of the transmitter.

In accordance with another aspect of the disclosure, one or more non-transitory computer-readable storage media storing computer-executable instructions that, when executed by one or more processors of a transmitter, cause the transmitter to perform operations are provided. The operations include receiving, by an upper layer of a transmitter, a plurality of service data units (SDUs), concatenating, by a converged L2 of the transmitter, plurality of SDUs received from the upper layer to obtain a protocol data unit (PDU), assigning, by the converged L2 of the transmitter, a L2 sequence number (SN) to the PDU, wherein the L2 SN includes at least one of a last SDU indicator (LSI) indicating a presence of a last SDU of the complete PDU, a length indicator exist (LIE) indicating a presence of a length indicator (LI) after a L2 header, or a segment indication (SI) indicating a segmentation status or stage of the complete PDU, receiving, by a medium access control (MAC) layer of the transmitter, a grant opportunity or a transmission opportunity for transferring the PDU available at the converged L2, and sending, by the MAC layer of the transmitter, the PDU to a lower layer of the transmitter for transmission to a receiver with or without segmentation based on the grant or a transmission opportunity.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
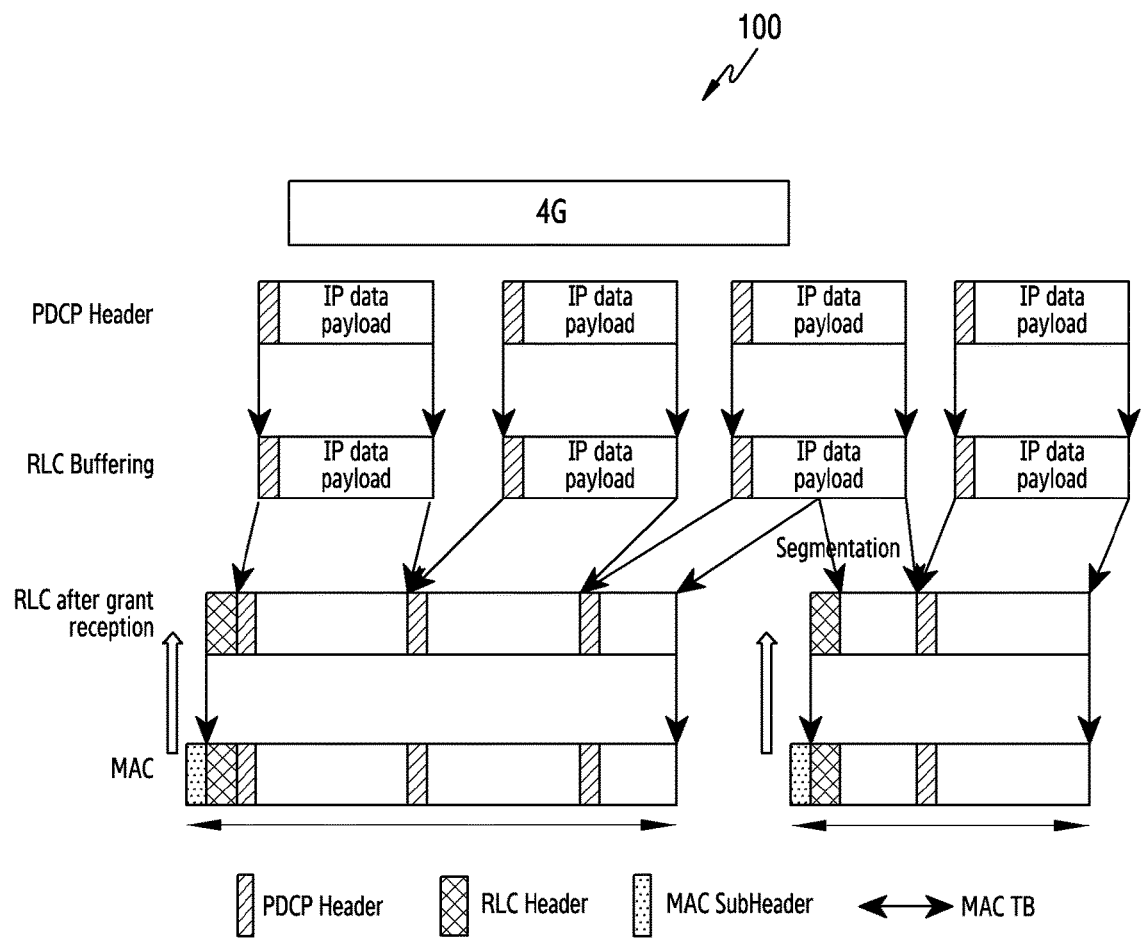
FIG. 1 illustrates a data plane in a long term evolution (LTE) (or $4^{th}$ generation (4G)) for packet processing, according to the related art.
Figure 2:
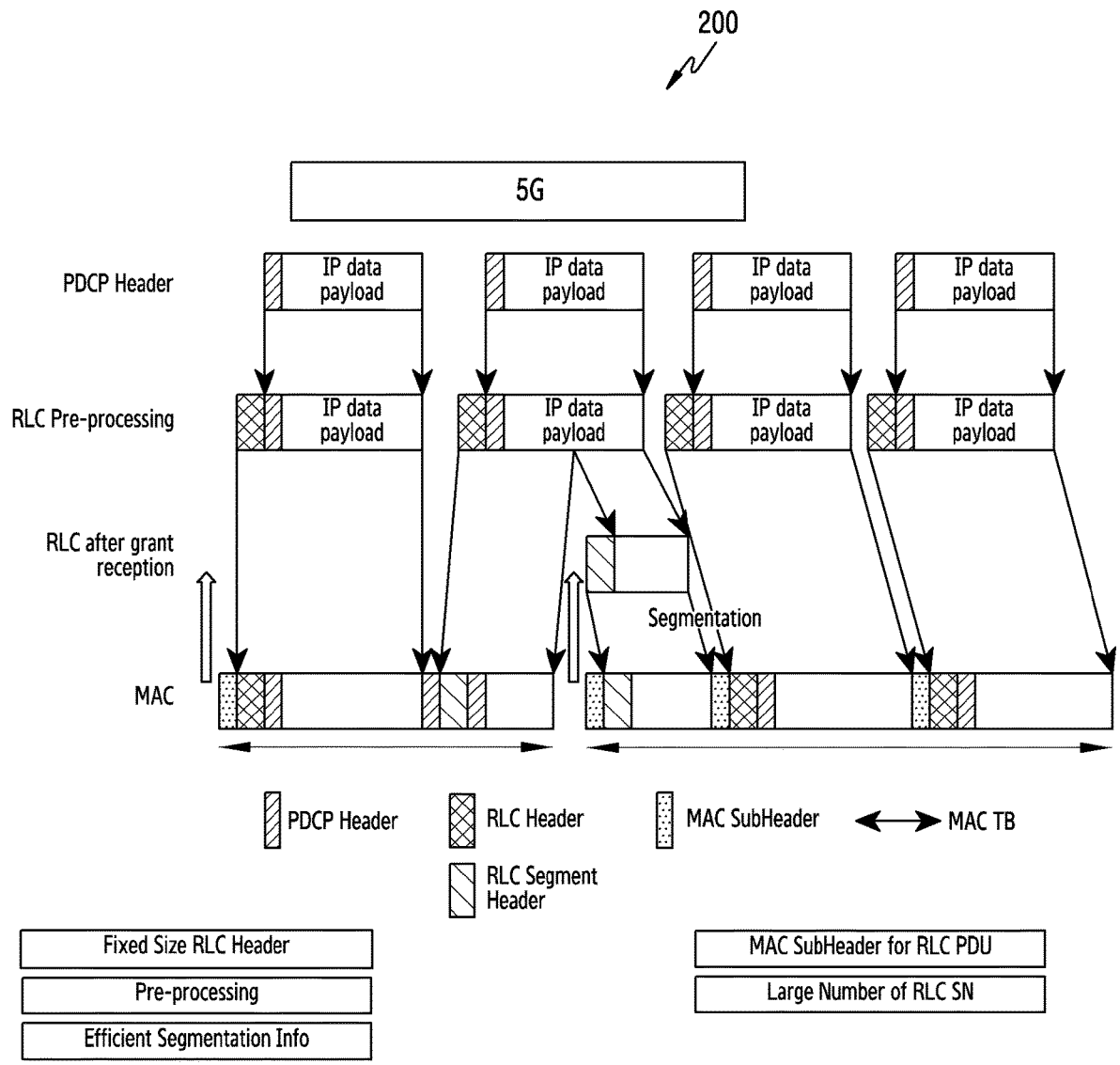
FIG. 2 illustrates a data plane in a new radio (NR) (or $5^{th}$ generation (5G)) for packet processing, according to the related art.
Figure 3:
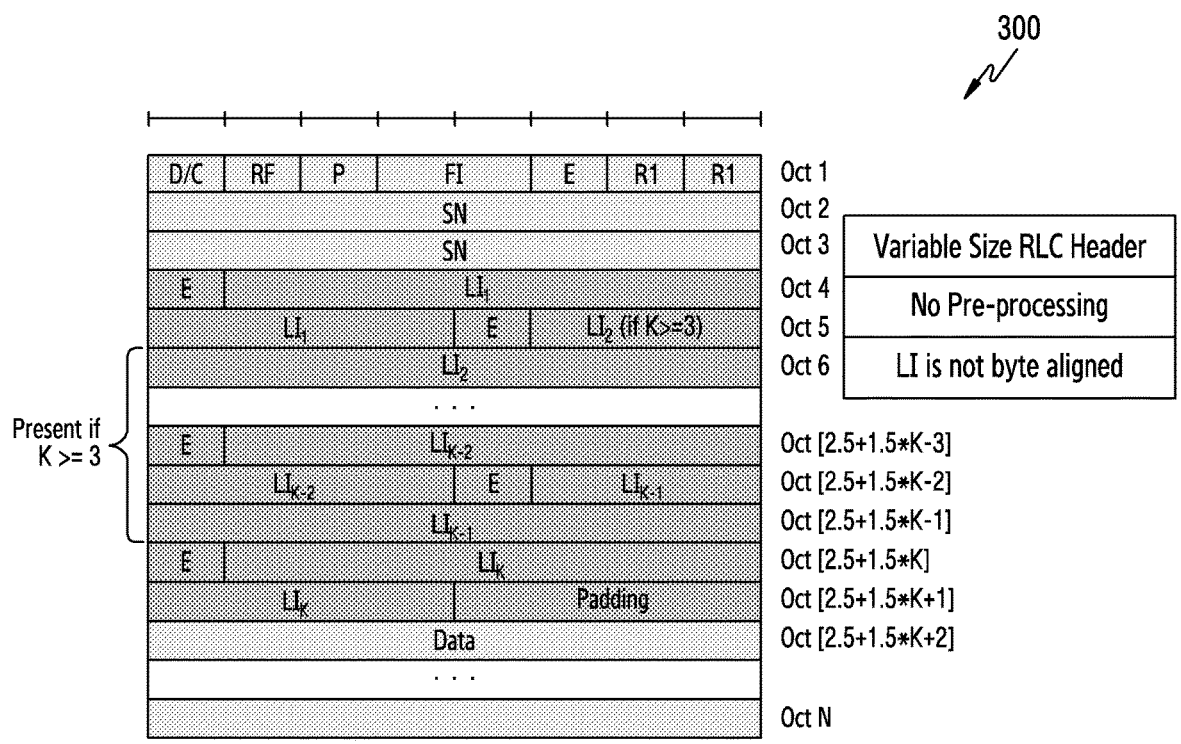
FIG. 3 illustrates a sample header structure in an LTE (or 4G) for a radio link control (RLC) layer, according to the related art.
Figure 3:
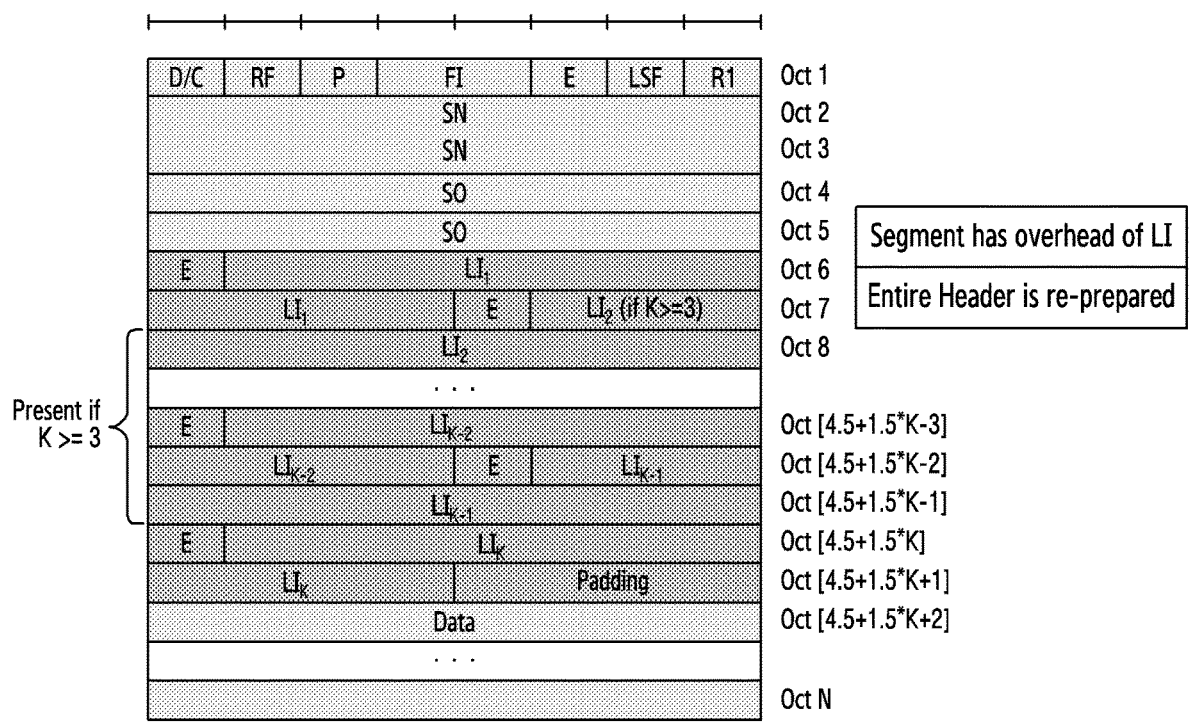
Figure 4:
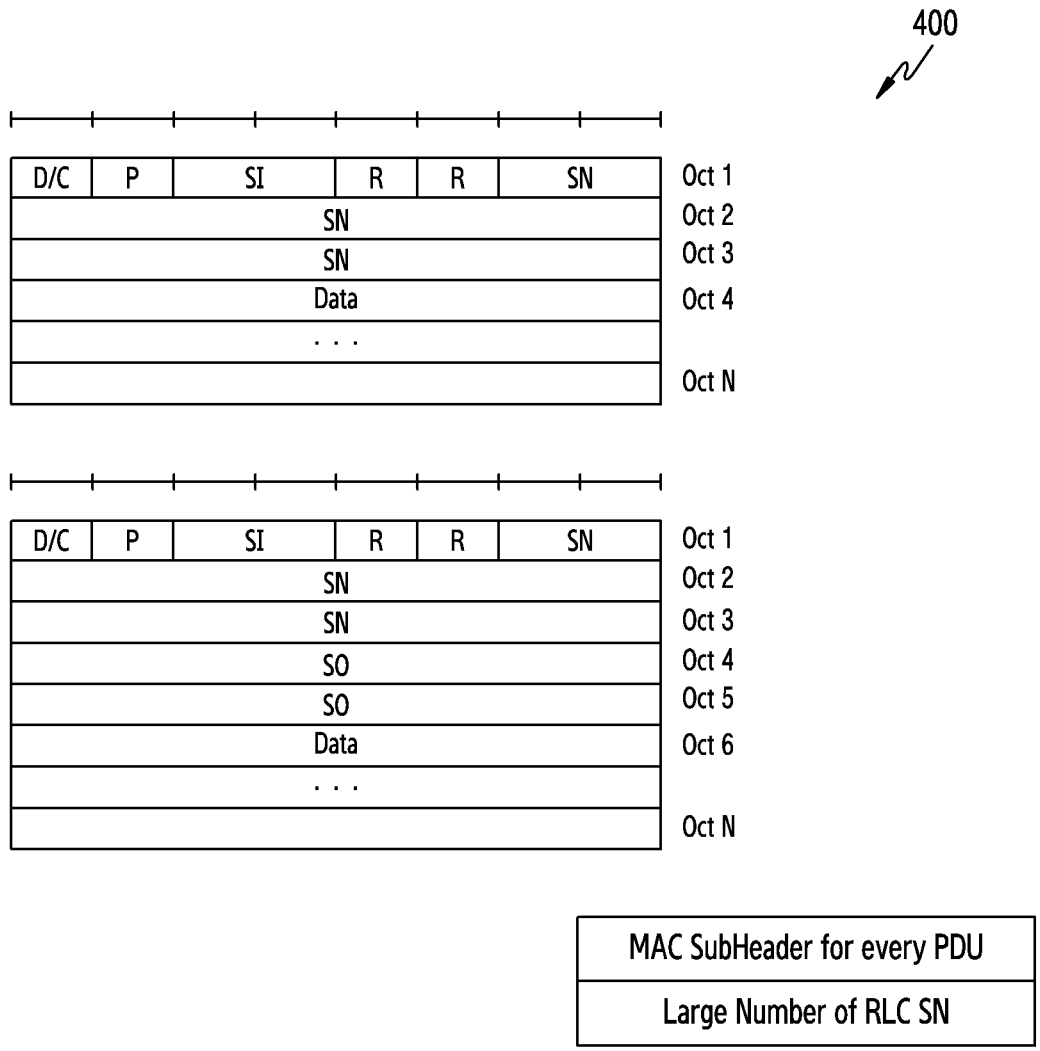
FIG. 4 illustrates a sample header structure in the NR (or 5G) for the RLC layer, according to the related art.
Figure 5:
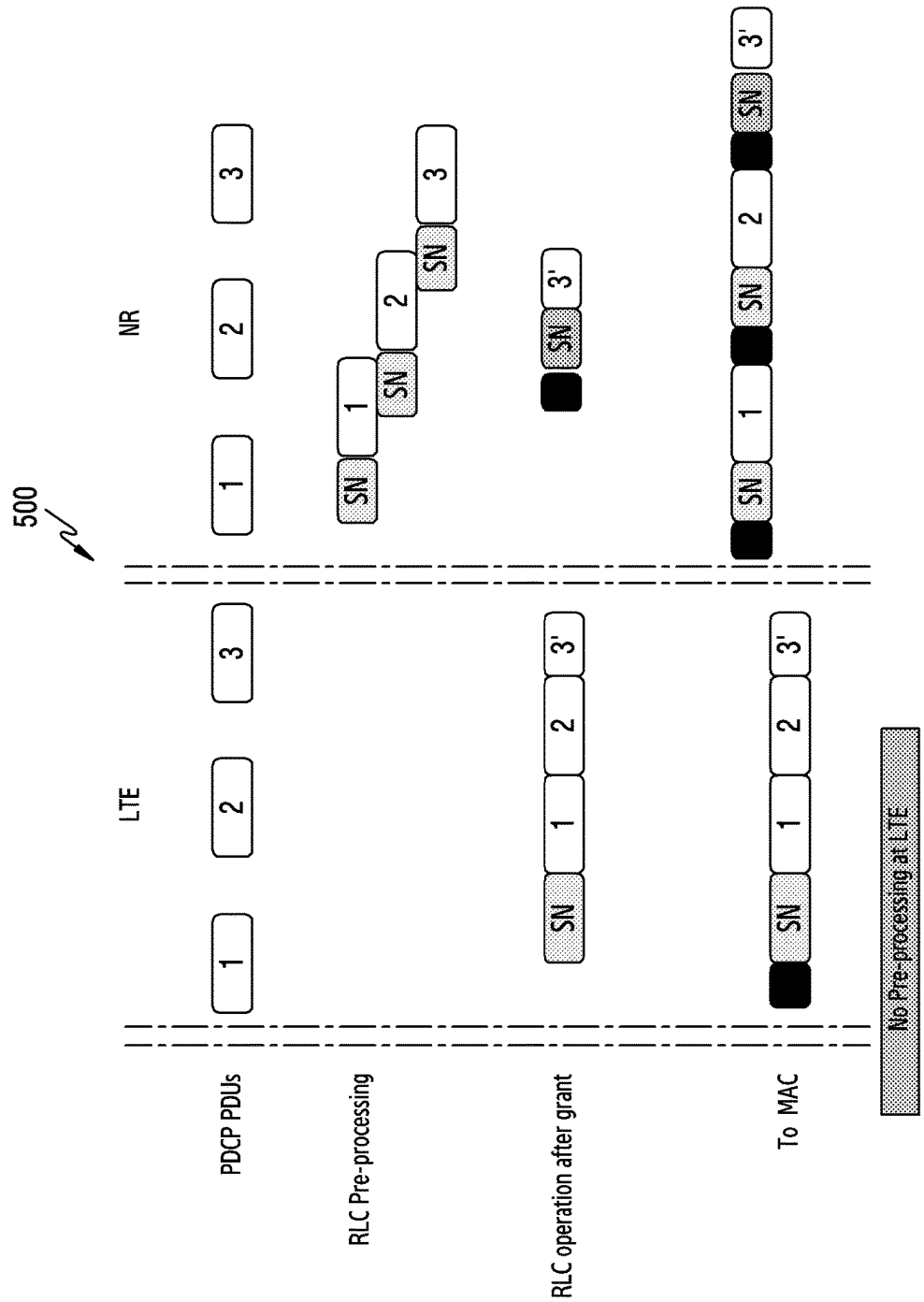
FIG. 5 illustrates a comparison between packet handling at a packet data convergence protocol (PDCP) layer and the RLC layer between an LTE (or 4G) and the NR (or 5G) according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

The description herein is intended merely to facilitate an understanding of ways in which the example embodiments herein can be practiced and to further enable those of skill in the art to practice the example embodiments herein. Accordingly, the disclosure should not be construed as limiting the scope of the example embodiments herein.

Various embodiments of the disclosure will now be described with reference to the accompanying drawings. In the following description, specific details, such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

In addition, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits, and the like, and may optionally be driven by a firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout the specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout the specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises" a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Embodiments disclosed herein provide a method for handling segmentation in a converged L2 communication network. The method includes receiving, by an upper layer of a transmitter, a plurality of SDUs. Further, the method includes concatenating, by a converged L2 of the transmitter, a plurality of SDUs received from the upper layer to obtain a PDU. Further, the method includes assigning by the converged L2 of the transmitter, a L2 SN to the PDU. The L2 SN includes at least one of a LSI indicating a presence of a last SDU of the complete PDU, a LIE indicating a presence of a LI after a L2 header, and a SI indicating a segmentation status or stage of the complete PDU. Further, the method includes receiving, by a MAC layer of the transmitter, a grant opportunity or a transmission opportunity for transferring the PDU available at the converged L2. Further, the method includes sending, by the MAC layer of the transmitter, the PDU to a lower layer of the transmitter for transmission to a receiver with or without segmentation based on the grant or a transmission opportunity.

The proposed method can be used for handling segmentation for the new protocol stack having simplified protocol for a high speed packet processing network, which has merged the functionalities of all Layer 2 modules especially PDCP and RLC into a single network function. The proposed method provides an opportunity to make lighter processing. In the proposed method, a smart header structure handles segmentation in case of packing the received grants with the available packets for a system in which the layer 2 PDU has already been pre-processed. Based on various methods through which length indicator fields are to be placed, the disclosure discusses about various variants which are possible. In addition, further segmentation being a real time processing functionality, the disclosure also discusses about various possibilities of different protocol stack layers that would perform the segmentation functionality while packing the upper layer packets into an available transmission size.

As per the variants for the header structure option for the converged Layer 2 header structure design, the position of the Length Indicator fields can vary based on whether it is placed together or placed with the packet payload. This particular case can have different variation in terms of interpretation of packet when the packet cannot be completely transferred due to segmentation.

The proposed method can be used for better header processing, such as header preparation/parsing. The proposed method can be used for fast transfer of data, recovery mechanisms and retransmissions for an acknowledged mode (AM), efficient reassembly in case of segmentation, duplicate detection, data security enhancements and header compression/decompression. The proposed method can be used for soft-real time processing and non-real time processing.

The proposed method can be used for efficient segmentation handling for the converged layer 2 header structure. In the proposed methods, multiple fields are added for managing the appropriate segmentation information, so the receiver can easily reassemble the packet. The proposed method can be used for controlling a bandwidth usage during a real-time processing. The proposed method reduces the header overhead, avoids in-order delivery and prioritizes a-priori grant information. The proposed method assists the lossless operation.

Referring now to the drawings, and more particularly to FIGS. 6 through 16, where similar reference characters denote corresponding features consistently throughout the figures, there are shown example embodiments.

Figure 6:
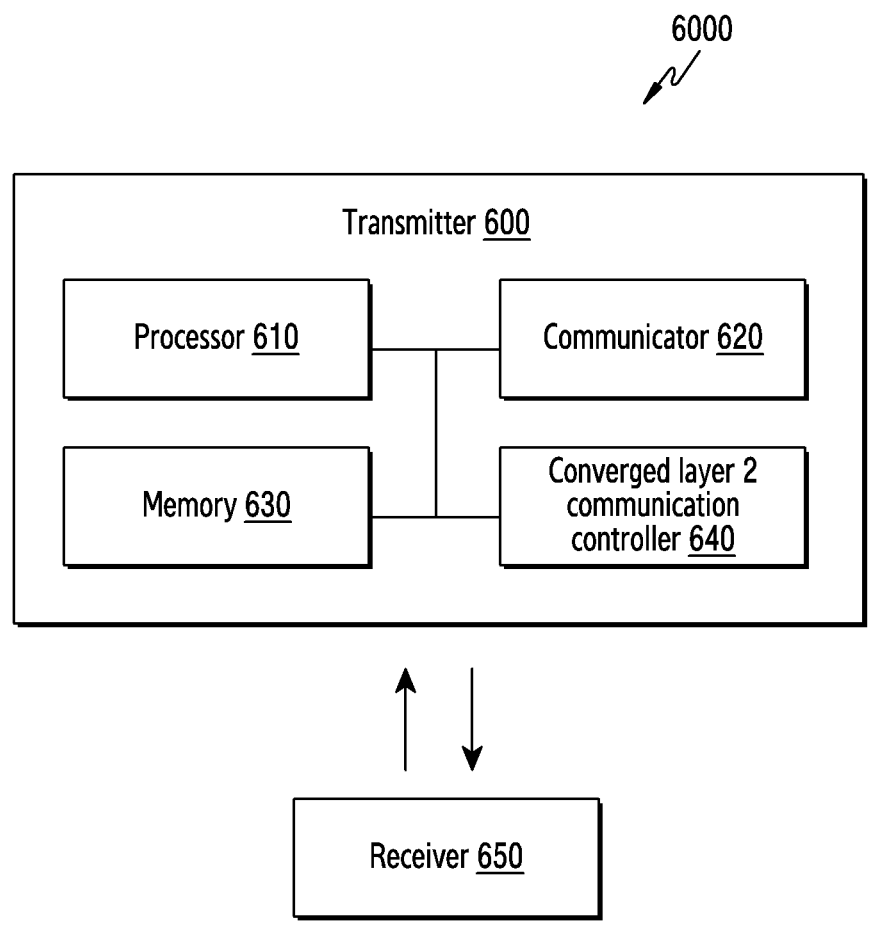
FIG. 6 illustrates various hardware components of a transmitter communicated with a receiver in a converged L2 communication network according to an embodiment of the disclosure.

FIG. 6 illustrates various hardware components of a transmitter communicated with a receiver in a converged L2 communication network 6000, according to an embodiment of the disclosure.

Referring to FIG. 6, in an embodiment of the disclosure, a transmitter 600 includes a processor 610, a communicator 620, memory 630 and a converged layer 2 communication controller 640. The processor 610 is coupled with the communicator 62), the memory 630 and the converged layer 2 communication controller 640.

The converged layer 2 communication controller 640 receives a plurality of SDUs using an upper layer of the transmitter 600. Further, the converged layer 2 communication controller 640 concatenates the plurality of SDUs received from the upper layer to obtain a PDU using a converged L2 of the transmitter 600. The concatenation of the plurality of SDUs to form a complete PDU is done in NTR. The segmentation is performed in real time (RT) by a layer between the converged L2 and the MAC layer or by a MAC layer using same SN as the packet at converged Layer 2 or a new identifier at MAC layer or a new layer between the Converged L2 and MAC layer.

Further, the converged layer 2 communication controller 640 assigns a L2 SN to the PDU using the converged L2 of the transmitter 600. The L2 SN includes an LSI indicating a presence of a last SDU of the complete PDU, a LIE indicating a presence of a LI after a L2 header, and a SI indicating a segmentation status or stage of the complete PDU. In an embodiment of the disclosure, the LSI is set high when the SI indicates the last SDU of the complete PDU. In an embodiment of the disclosure, the LIE is set high when the LI exist following the L2 Header.

Further, the converged layer 2 communication controller 640 receives a grant opportunity or a transmission opportunity for transferring the PDU available at the converged L2 using a MAC layer of the transmitter 600. Further, the converged layer 2 communication controller 640 sends the PDU to a lower layer of the transmitter 600 for transmission to a receiver 650 with or without segmentation based on the grant or a transmission opportunity using the MAC layer of the transmitter 600.

In an embodiment of the disclosure, the converged layer 2 communication controller 640 determines whether the grant opportunity or the transmission opportunity is enough to send a complete PDU to the receiver 650 using the MAC layer of the transmitter 600. Further, the converged layer 2 communication controller 640 sends the complete PDU to a lower layer of the transmitter 600 for transmission to the receiver 650 without segmentation based on the grant opportunity or the transmission opportunity, when the grant opportunity is enough to send the complete PDU using the MAC layer of the transmitter 600.

In another embodiment of the disclosure, the converged layer 2 communication controller 640 determines whether the grant opportunity or the transmission opportunity is enough to send a complete PDU to the receiver 650 using the MAC layer of the transmitter 600. Further, the converged layer 2 communication controller 640 segments the complete PDU into a plurality of PDU segments based on the grant opportunity or the transmission opportunity. Further, the converged layer 2 communication controller 640 sends the plurality of PDU segments to the lower layer of the transmitter 600 for transmission to the receiver 650, when the grant opportunity or the transmission opportunity is not enough to send the complete PDU.

In another embodiment of the disclosure, the converged layer 2 communication controller 640 creates a MAC PDU by assigning a SI indicating that the complete PDU is not segmented, a LSI indicating that the complete PDU includes the last SDU which was concatenated to form by the completed PDU at the converged L2, and a LIE indicating a presence of a length Indicator as a L2 Sub Header including an LI field for the plurality of SDUs using the MAC layer of the transmitter 600. Further, the converged layer 2 communication controller 640 sends the MAC PDU to the lower layer of the transmitter 600 for transmission to the receiver 650 using the MAC layer of the transmitter 600.

In an embodiment of the disclosure, the converged layer 2 communication controller 640 creates the segment header for each PDU segment of the plurality of PDU segments based on the grant opportunity or the transmission opportunity using the MAC layer of the transmitter 600. Further, the converged layer 2 communication controller 640 assigns the identifier field with the same L2 SN to each PDU segment in the segment header using the MAC layer of the transmitter 600. The identifier field for the PDU segments in a same L2 Header, where the same L2 SN is assigned for all the PDU segments of the complete PDU. The L2 SN includes a segmentation offset (SO) field, where the SO field indicates offset from a first byte of a payload. The converged layer 2 communication controller 640 create a MAC PDU by assigning a MAC sub header to the plurality of PDU segments of the complete PDU using the MAC layer of the transmitter 600. Further, the converged layer 2 communication controller 640 send the MAC PDU to the lower layer of the transmitter 600 for transmission to the receiver 650 using the MAC layer of the transmitter 600.

In an embodiment of the disclosure, the converged layer 2 communication controller 640 determines whether the grant opportunity or the transmission opportunity is enough to send the original LI in TTIs using the MAC layer of the transmitter 600. Further, the converged layer 2 communication controller 640 sends the original LI in all payloads of the PDU segments of the MAC PDU in subsequent TTIs using the MAC layer of the transmitter 600, when the grant opportunity or the transmission opportunity is enough to send the original LI in the subsequent TTIs.

In an embodiment of the disclosure, the converged layer 2 communication controller 640 determines whether the grant opportunity or the transmission opportunity is enough to send the original LI in TTIs using the MAC layer of the transmitter 600. Further, the converged layer 2 communication controller 640 sends the truncated LI only for the portion of the SDU which is present in the PDU segments of the MAC PDU after segmentation, using the MAC layer of the transmitter 600.

The converged layer 2 communication controller 640 is implemented by analog and/or digital circuits, such as logic gates, integrated circuits, microprocessors, microcontrollers, memory circuits, passive electronic components, active electronic components, optical components, hardwired circuits and the like, and may optionally be driven by firmware.

The processor 610 may include one or a plurality of processors. The one or the plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU).

The processor 610 may include multiple cores and is configured to execute the instructions stored in the memory 630.

Further, the processor 610 is configured to execute instructions stored in the memory 630 and to perform various processes. The communicator 620 is configured for communicating internally between internal hardware components and with external devices via one or more networks. The memory 630 also stores instructions to be executed by the processor 610. The memory 630 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 630 may, in some examples, be considered a non-transitory storage medium. The term "non-transitory" may indicate that the storage medium is not embodied in a carrier wave or a propagated signal. However, the term "non-transitory" should not be interpreted that the memory 630 is non-movable. In certain examples, a non-transitory storage medium may store data that can, over time, change (e.g., in random access memory (RAM) or cache).

Although the FIG. 6 shows various hardware components of the transmitter 600 but it is to be understood that other embodiments are not limited thereon. In other embodiments of the disclosure, the transmitter 600 may include less or more number of components. Further, the labels or names of the components are used only for illustrative purpose and does not limit the scope of the disclosure. One or more components can be combined together to perform same or substantially similar function in the transmitter 600.

Figure 7:
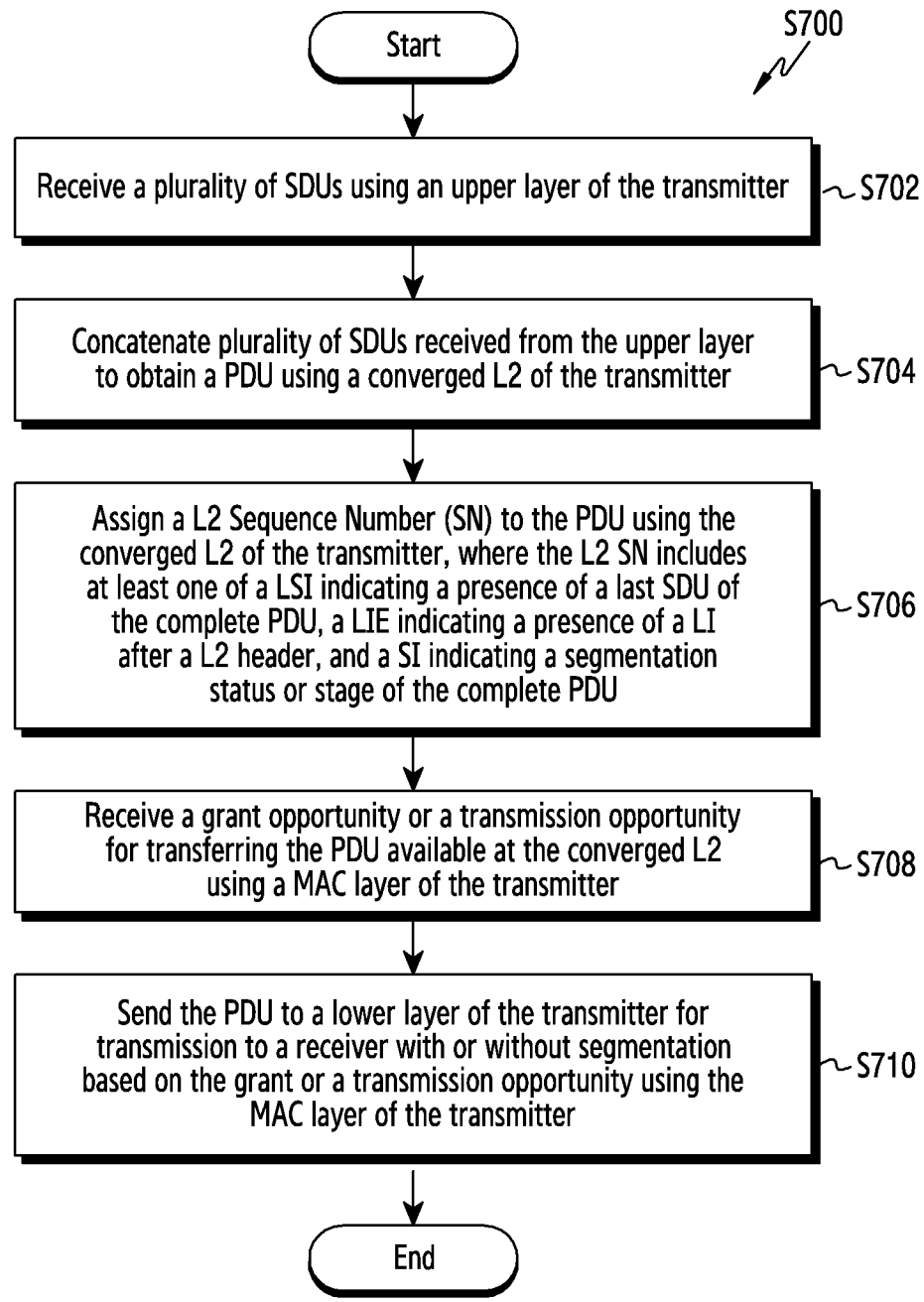
FIG. 7 is a flowchart illustrating a method for handling the segmentation in the converged L2 communication network according to an embodiment of the disclosure.

FIG. 7 is a flowchart S700 illustrating a method for handling a segmentation in a converged L2 communication network 6000 according to an embodiment of the disclosure.

Referring to FIG. 7, the operations S702 to S710 are handled by the converged layer 2 communication controller 640.

At operation S702, the method includes receiving the plurality of SDUs by the upper layer of the transmitter 600. At operation S704, the method includes concatenating the plurality of SDUs received from the upper layer to obtain the PDU by using the converged L2 of the transmitter 600. At operation S706, the method includes assigning the L2 SN to the PDU by the converged L2 of the transmitter 600. The L2 SN includes the LSI indicating a presence of a last SDU of the complete PDU, the LIE indicating the presence of the LI after a L2 header, and the SI indicating a segmentation status or stage of the complete PDU. At operation S708, the method includes receiving the grant opportunity or the transmission opportunity for transferring the PDU available at the converged L2 by the MAC layer of the transmitter 600. At operation S710, the method includes sending the PDU to the lower layer of the transmitter 600 for transmission to a receiver 650 with or without segmentation based on the grant or a transmission opportunity by the MAC layer of the transmitter 600.

The proposed method can be used for better header processing, such as header preparation/parsing. The proposed method can be used for fast transfer of data, recovery mechanisms and retransmissions for an AM mode, efficient reassembly in case of segmentation, duplicate detection, data security enhancements and header compression/decompression. The proposed method can be used for soft-real time processing and non-real time processing.

The proposed method can be used for efficient segmentation handling for the converged layer 2 header structure. In the proposed methods, multiple fields are added for managing the appropriate segmentation information, so the receiver can easily reassemble the packet. The proposed method can be used for controlling a bandwidth usage during a real-time processing. The proposed method reduces the header overhead, avoids in-order delivery and prioritizes a-priori grant information. The proposed method assists the lossless operation.

Figure 8:
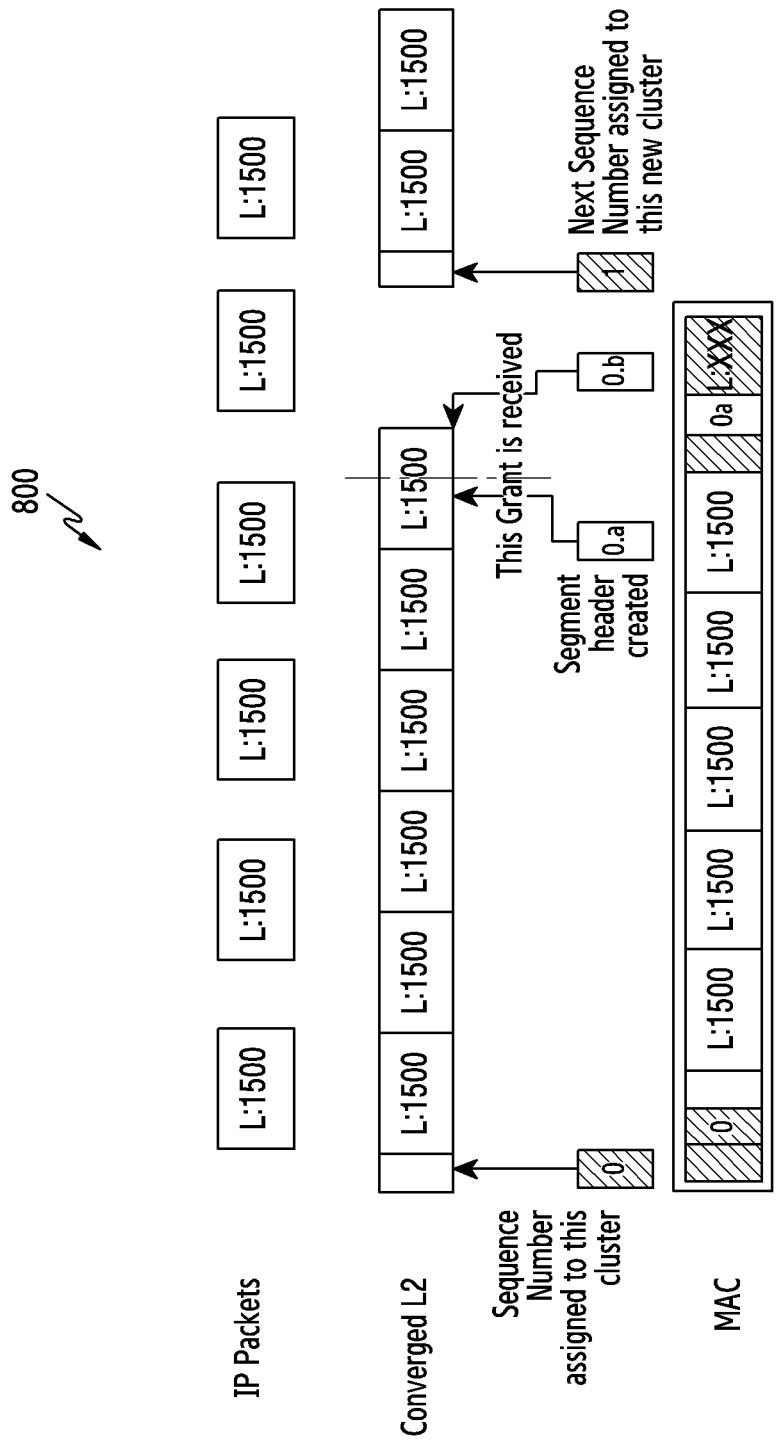
FIG. 8 illustrates a scenario in which a need for segmentation and an indicative procedure to handle segmentation is depicted according to an embodiment of the disclosure.

FIG. 8 illustrates a scenario 800 in which a need for segmentation and an indicative procedure to handle segmentation is depicted according to an embodiment of the disclosure.

Referring to FIG. 8, a single SN is assigned to a cluster of IP packets based on the clustering rules. Information about the segment generation of the original PDU need to be indicated in the first Packet as well, if required. The MAC layer creates a segment header based on the grant reception. The MAC layer utilizes the same SN and uses nomenclature to indicate the segment header with indication, such as SN.a (where .a is indicating the segment offset information). This is just a concept to showcase how it is required to be done. In subsequent grants, the remaining segment of the packet is transferred as SN.b, SN.c, or the like, until the end of segment is completely transmitted. In general, every converged L2 PDU or the segmented PDU gets assigned a MAC SubHeader.

Referring to FIG. 8, it is a necessary step to only transmit the data packet as per what is available at the transmission opportunity. The portion of the Layer 2 PDU, which cannot be transferred in the current transmission opportunity, or grant, should wait for the next transmission opportunity and transfer the remaining payload with the information containing significant information about the original payload, such as identity of the particular packet, offset of the packet from the original payload, and the type of segment. Hence, any packet which is getting segmented should be able to convey important information such that the original payload should be formed at the receiver 650 when it receives these segments of packets completely over a duration of time. When the packets have been preprocessed and the length indicator have been added, it is important that the header information of the segments should also help to interpret the lengths of the data packets which are contained in the segmented PDUs. Thus, based on the various cases, there are multiple variants in which the length information can be transferred. When grants are enough and complete packet can be transferred as shown in FIG. 8, there should not be any need to make any changes to the Layer 2 header as it has been processed in the Non Real time and only the transmission opportunity should take care of sending the packet out to lower layer. Based on the Length Indicator variant type, the interpretation can change for deciding the start of segment offset (SO).

Figure 9:
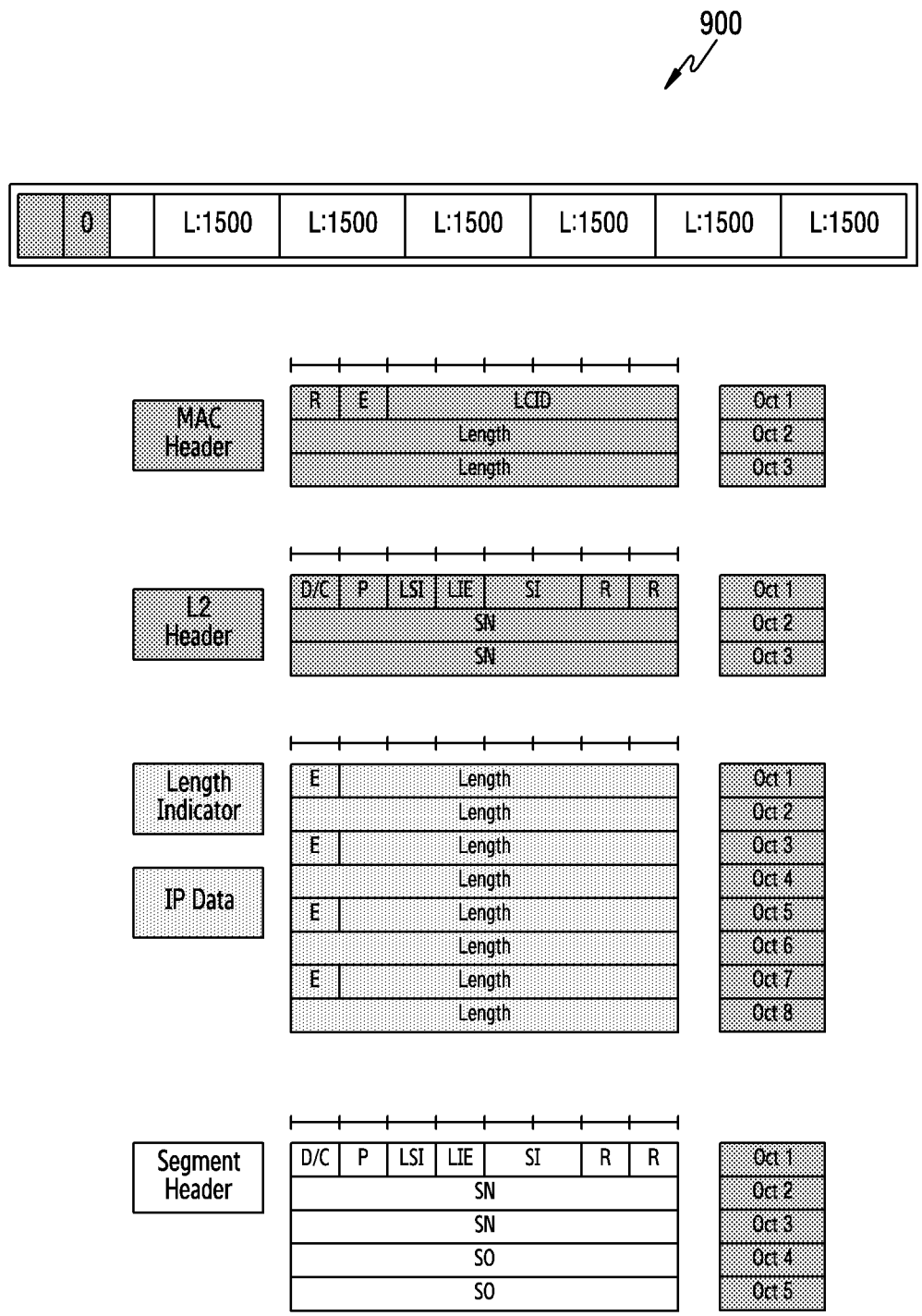
FIG. 9 illustrates a proposed header structure which allows handling segmentation for a converged layer 2 header structure design, according to an embodiment of the disclosure.

FIG. 9 illustrates a proposed header structure 900 which allows handling segmentation for a converged layer 2 header structure design, according to an embodiment of the disclosure. Below is a header structure for segmentation:

Referring to FIG. 9, in the LSI, a bit 1 indicates a packet when segmented contains the last SDU of the original PDU. A bit 0 indicates the packet when segmented does not contain the last SDU of the original PDU. In the LIE, a bit 1 indicates the length indicator exist following the L2 Header and the bit 0 indicates the length indicator does not exist after L2 Header. The SI interpretation is same as NR. In the SI, Bit 00 indicates the complete L2 PDU is sent, bit 01 indicates the first segment, bit 11 indicates the middle of Segment and the bit 10 indicates End of Segment In the example shown in FIG. 8, the SO=0 is the beginning of the data packet placed immediately after the Length Indicator field sub-headers as per one of the variants of the proposal.

In an embodiment of the proposal, when less grants are received and if it is possible to send all the Length Indicator fields that are placed together, it can be transferred completely in the first grant. The remaining portion of the original PDU can be sent just by using additional SO field and appropriate SI fields as per the NR prior art. A new field in the L2 header is added as last SDU Indicator (LSI), which signifies that if this bit is set to 1, then the current segmented PDU contains the last byte of the original Layer 2 PDU which was formed as shown in FIG. 9, otherwise, if it is set to 0, it does not contain the last byte of the original Layer 2 PDU. Based on the proposal, a sample header structure for Segmentation handling is also shown in FIG. 9 for managing efficient segmentation information, when packets are to be transferred with less transmission opportunity available as compared to the size of the original packet formed at Layer 2.

Figure 11:
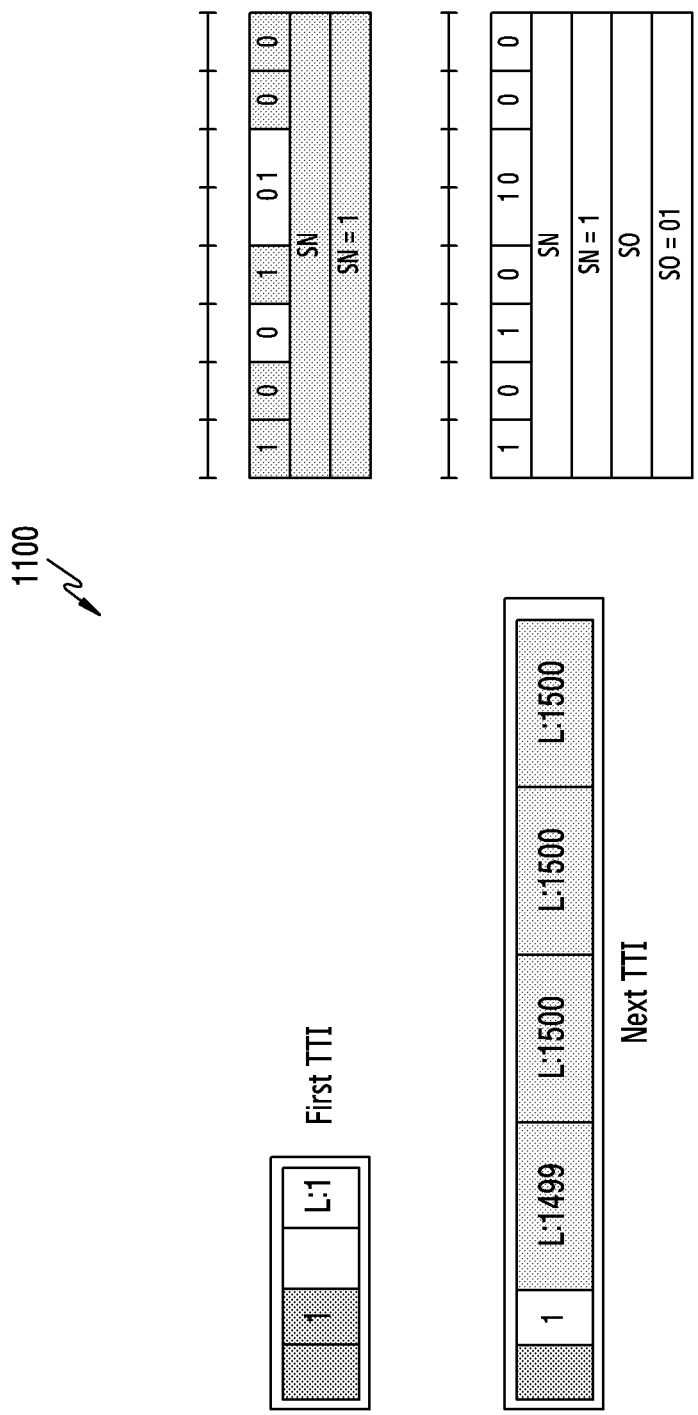
FIG. 11 illustrates one variant where the packet is truncated into two segments such that a first segment has a complete length indicator information of an entire protocol data unit (PDU), according to an embodiment of the disclosure.
Figure 12:
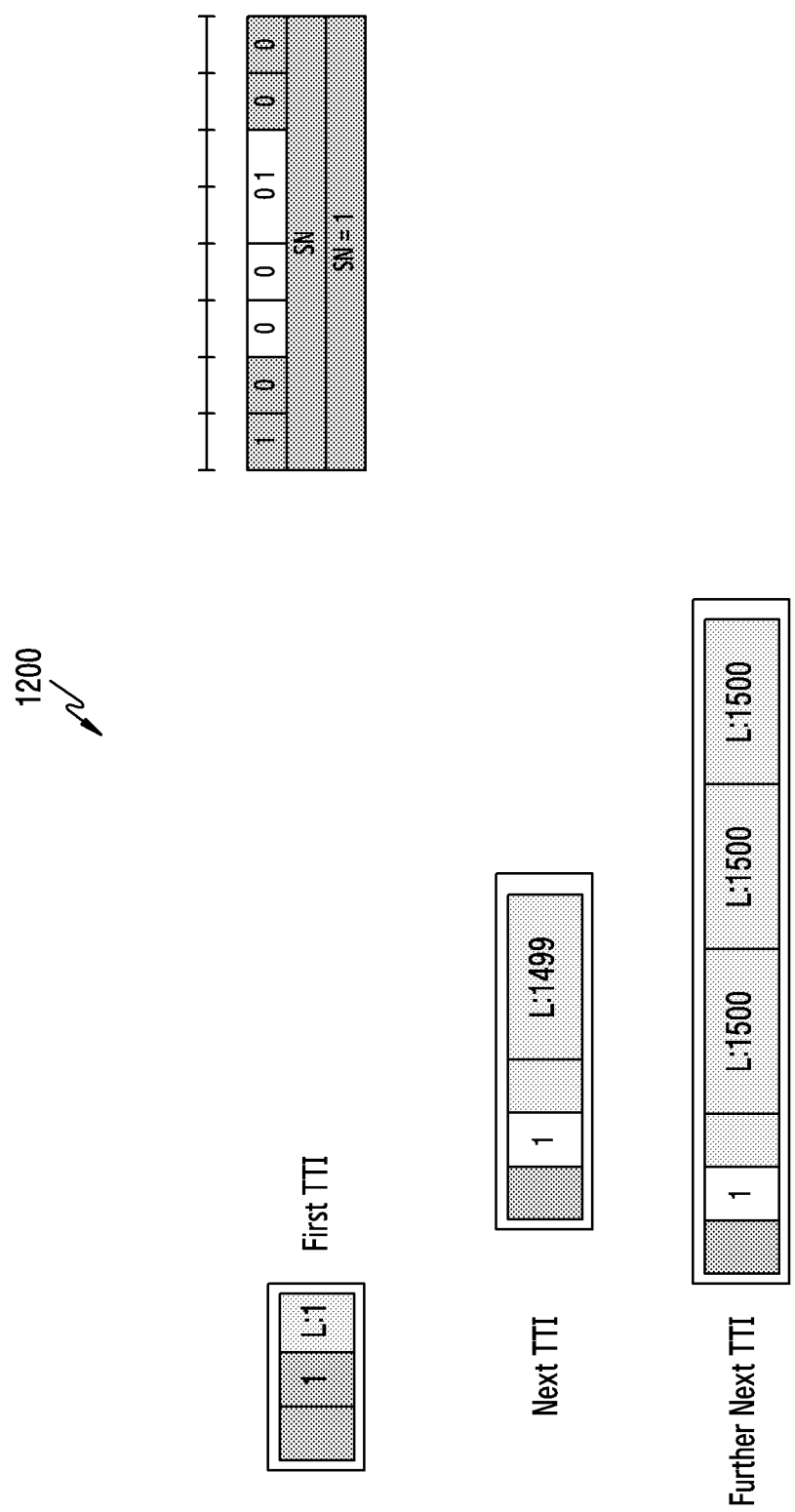
FIG. 12 illustrates a variant for a header structure handling such that a length indicator field is same as an original PDU and sent only when grants are not enough to accommodate complete PDU according to an embodiment of the disclosure.
Figure 13:
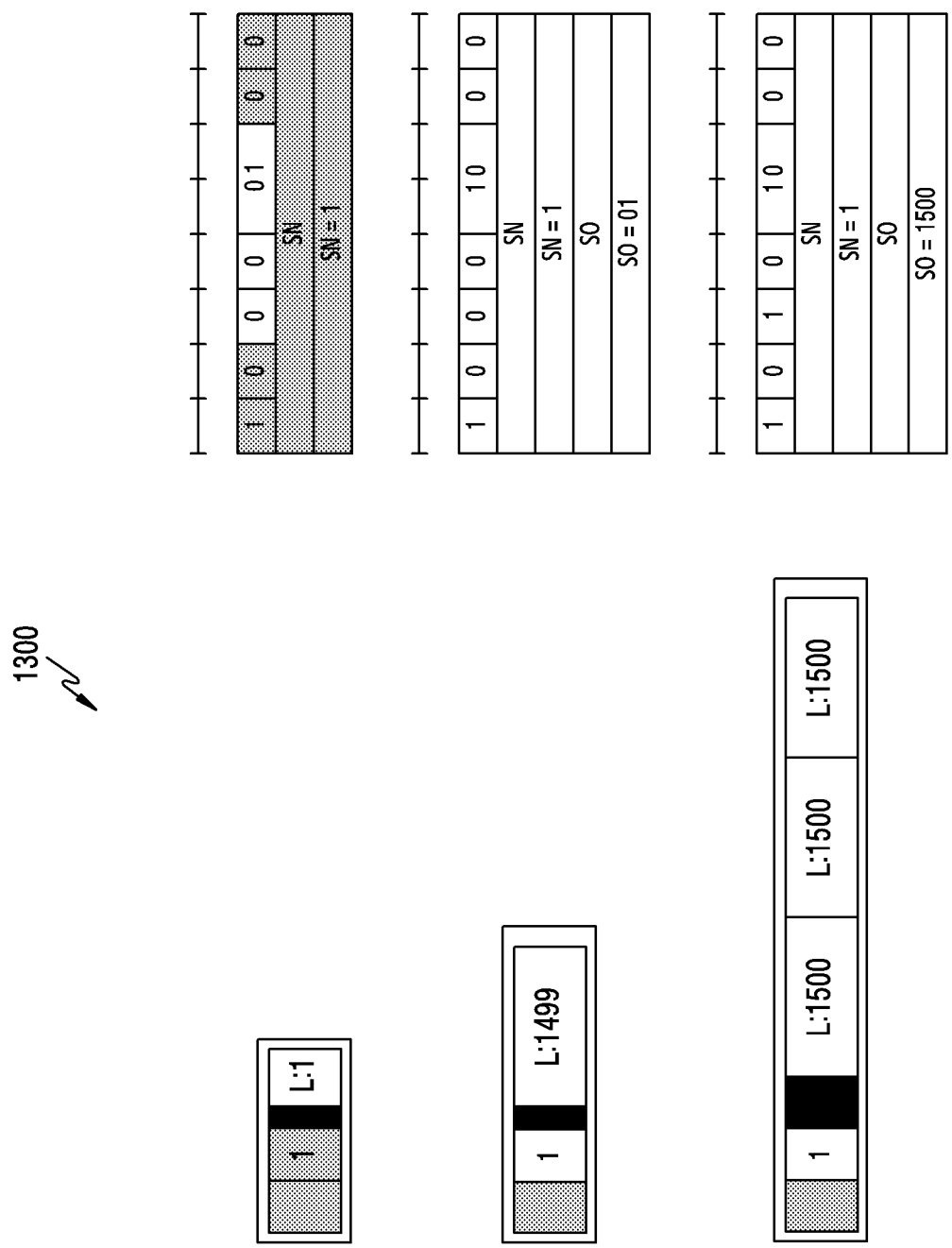
FIG. 13 illustrates a variant for a header structure handling required for a length indicator, which adds only a relevant length indicator fields as per a number of segments of a service data unit (SDU) present in the PDU according to an embodiment of the disclosure.
Figure 14:
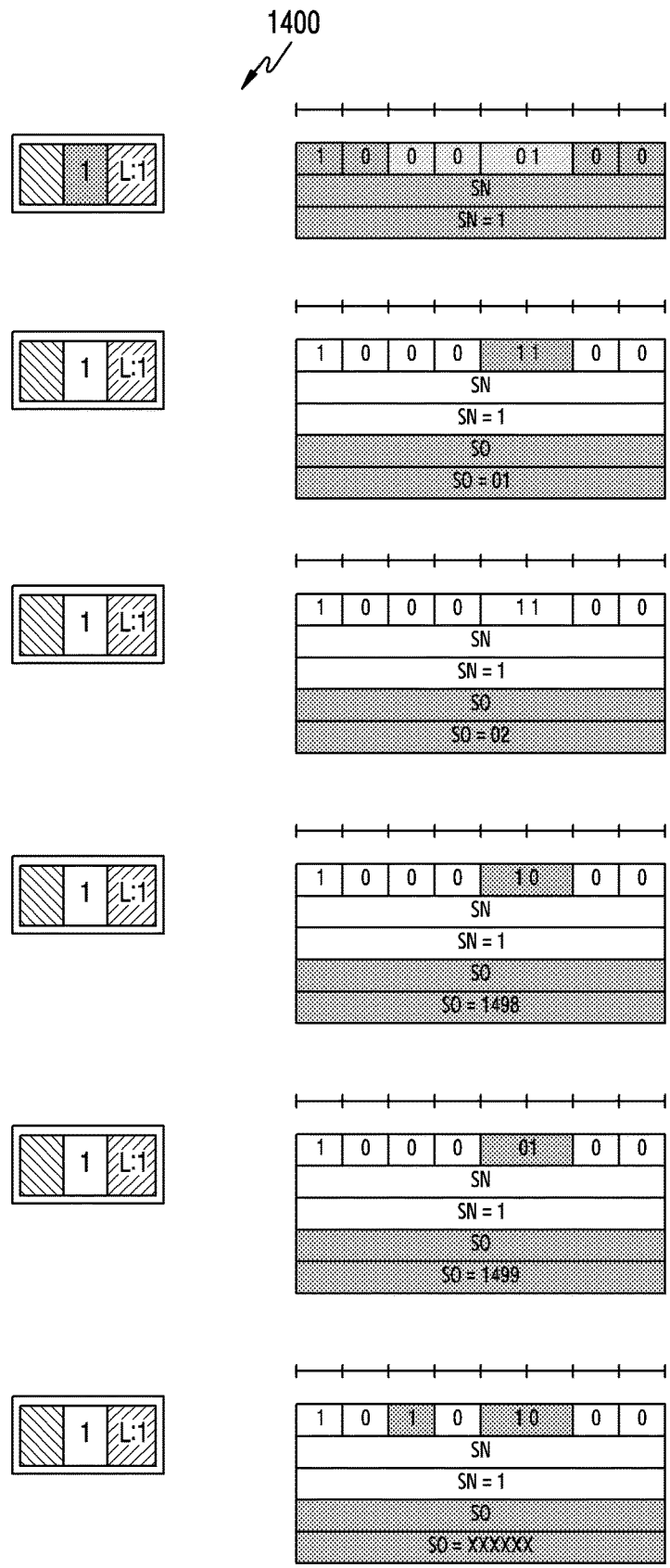
FIG. 14 illustrates a hypothetical scenario where transmission grants are so less that it is not possible to send a length indicator fields at all for any of segments, still the segment transmission is possible, according to an embodiment of the disclosure.

Additionally, when the packet is getting segmented, it is possible that Length Indicator fields lie only in the first segment as shown in FIG. 11, or the original Length Indicator fields are present in all the segments which are transferred wherever there is a possibility to send the LI fields together as shown in FIG. 12, or add Length Indicator fields only for those segments based on the actual length of the segments being sent as shown in FIG. 13. This form multiple variants for the segment handling case. In case when the grants are too less, if the Length Indicator field can never be sent, the combination of SI, SO and LSI can still be used to send the relevant information and use to form the original packet at the receiver 650 as shown in FIG. 14. Based on the scenario of transmission, the minimum grant size which is required to be handle varies for each case. For example, when the Length Indicator fields are to be sent in the first segment of the payload, the minimum grant size available should be equal to the size of MAC sub-header, plus the size of the Layer 2 Header and plus the size of all the Length Indicator fields present in the PDU with at least 1 byte of data payload to be transmitted. Thus, for this case as shown in FIG. 11, the minimum grant size is dependent for the number of data packets packed in the PDU. For example, if the number of data packets concatenated are equal to 4, then the minimum grant size required to transmit as per the FIG. 11 will be =size of MAC sub-Header (3)+size of Layer 2 Header (3)+size of LI fields (3*number of packets=3*4=12)+at least 1 byte of data payload to be transmitted=19 bytes. The next subsequent grants do not contain any length indicator field requirement.

As per the another option, when in case, if the length indicator field is to be transmitted at any transmission opportunity which allows this transmission, the original length indicator fields are added in every segment of the packet whenever there is a transmission opportunity big enough to transmit the packet as shown in FIG. 12. It is possible that for this variant, no length information field is transferred in case when grant is too low. In another variant where the Length Information field corresponding to only those segments of SDUs or complete SDUs present in the segmented PDU as shown in FIG. 13. In this case, the minimum grant size which is required is size of MAC sub-Header, plus size of Layer 2 Header, plus size of the Length Indicator field (at least one Length Indicator field, that is 2 bytes) and at least one byte of data payload. Thus as per an example of this proposed scheme, the minimum segment packet which can be sent out as per FIG. 13, is =3+3+2+1=9 bytes. In case, when the middle of segment is to be transferred, the segment header size contains two bytes more to indicate the SO field and hence, the minimum size of the segmented PDU is 11 bytes in that case. However, as shown in FIG. 13, it is also possible that if there is no transmission opportunity big enough and a hypothetical case of minimum grant available to just transmit a single byte payload along with appropriate layer 2 headers, the header structure still allows to continue the transmission with 3+5+1=9 bytes on subsequent transmissions as well.

Figure 15:
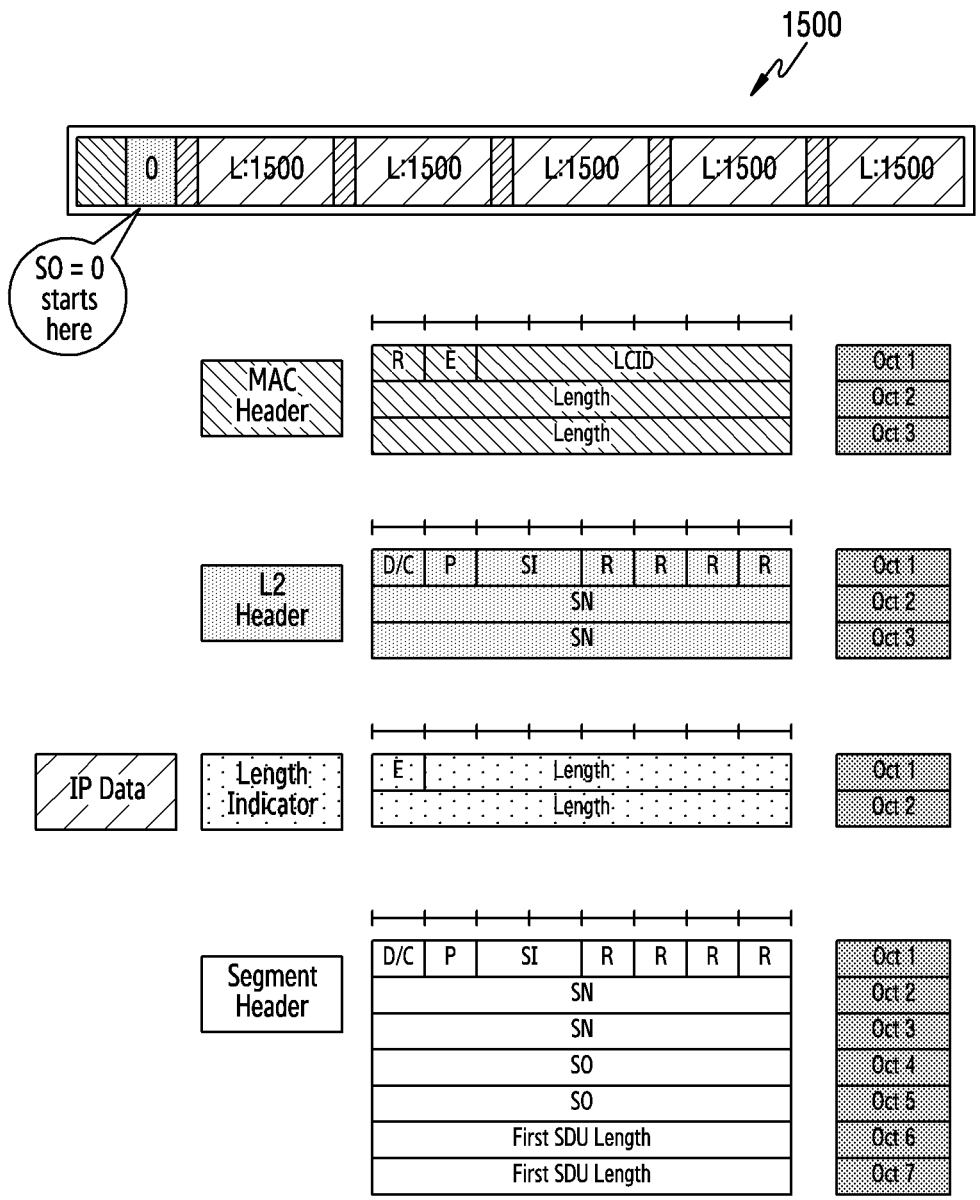
FIG. 15 illustrates a variant of a header structure design where a length indicator fields are placed next to a packet payload, and when a packet is segmented, it shows an additional fields required in a segment header, according to an embodiment of the disclosure.

As per another embodiment of this proposal, if the Length Indicator field is attached to individual data packets or SDU, then the interpretation of segmentation requires separate field as shown in FIG. 15. Although, LIE and LSI fields are not required for the variant, it can still be used to send additional information if required. The SI field and SO fields interpretation is kept same as NR. However, a new field in the segment header is required called the first SDU length. The field indicates the length of the first SDU in the segment. This helps to obtain the next SDU starting point as the Length Indicator field of that SDU can be interpreted quickly. Additionally, if first SDU length is not to be added in certain segment fields, an additional bit field is required to be added to indicate whether first SDU length exists or not.

Figure 10:
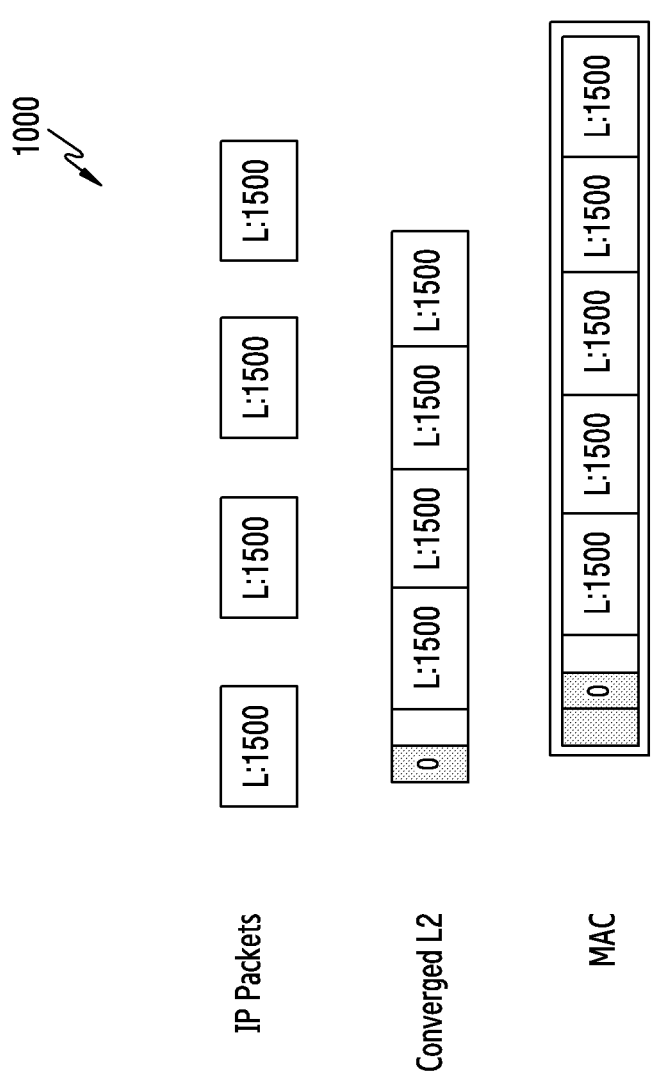
FIG. 10 illustrates a when grants are enough to pack the complete payload prepared at a layer 2, such that there is no need to segment the packet, according to an embodiment of the disclosure.

FIG. 10 illustrates a scenario 1000 when grants are enough to pack a complete payload prepared at a layer 2, such that there is no need to segment the packet, according to an embodiment of the disclosure.

Referring to FIG. 10, SI=00 indicates that the packet is not segmented. The LSI=1 indicates that the PDU contains the last SDU which was formed by the PDU at the converged L2. The LIE=1 indicates that the length indicator exists as the L2 Sub Header containing the LI field for all SDU exist.

The packet when received completely at the receiver 650, will be able to find the boundaries of all the SDUs at L2 and proceed forward without any segmentation. Since all the information related to SDU boundary and pre-processed PDU is contained in the header as the length indicator fields (LI) are all intact, the receiver 650 can deduce all the relevant information from the header fields as indicated in the image above.

FIG. 11 illustrates variant 1100 where the packet is truncated into two segments such that a first segment has a complete length indicator information of an entire PDU, according to an embodiment of the disclosure.

Referring to FIG. 11, with this case, the pre-processed SDU is broken into multiple segments, with Length Indicator (LI) being present in the first segment, if it has enough grants. In the first TTI, SI=01->Indicates that packet is segmented and this is first segment.
LSI=0->Indicates that the PDU does not contain the last SDU which was formed by the PDU at the converged L2.
LIE=1->Indicates that the length indicator exists as the L2 sub header containing the LI field for all original SDU exist.

In the next TTI, Let's assume the entire remaining PDU was possible to be transmitted, SI=10->Indicates that packet is segmented and this is last segment.
LSI=1->Indicates that the PDU contains the last SDU which was formed by the PDU at the converged L2.
LIE=0->Indicates that the length indicator exist does not exist.

SO=1->Segment offset is set to 1, showing that this is from 1 byte offset from the original PDU.

Segment offset numbering starts from first byte of the first SDU in the original PDU (post the L2 Sub Header, i.e., LI field is not included) (changes with variants).

FIG. 12 illustrates variant 1200 for a header structure handling such that a length indicator field is same as an original PDU and sent only when grants are not enough to accommodate complete PDU according to an embodiment of the disclosure. The proposed method allows to send original Length Indicator field in all payloads whenever possible in subsequent TTIs.

Referring to FIG. 12, whenever there is a chance to send all LI fields, all LI fields are sent as per original payload. The receiver 650 interprets based on the received offset about what is the LI field of relevance and neglects those which are not required. Receiver 650 understands the end of SDU based on the segmentation information and LSI. Since the LI information is received in at least one of the segments, the complete boundaries can be interpreted based on the length information of the original SDUs.

FIG. 13 illustrates variant 1300 for a header structure handling required for a length indicator, which adds only a relevant length indicator fields as per a number of segments of an SDU present in a PDU, according to an embodiment of the disclosure.

Referring to FIG. 13, the variant 2 sends the length indicator only for those SDUs which are present in the segmented PDU, whereas the variant 1 sends all LI fields. The first packet contains LI only 1 L2 sub-Header of 2 bytes=1, SI=01, LSI=1 Next TTI contains LI=1499 to indicate what is present in that packet. SI=10, for end of SDU, LSI=0, for no end of PDU. Next TTI contain LI=1500 for each SDU present as per the original SDU length as shown. SI=10, for end of SDU, LSI=1, for end of PDU.

FIG. 14 illustrates a hypothetical scenario 1400 where transmission grants are so less that it is not possible to send length indicator fields at all for any of the segments, still the segment transmission is possible, according to an embodiment of the disclosure.

Referring to FIG. 14, in order to handle this case at the receiver 650, the length of the segmented PDU is informed in MAC Sub Header by default. In this example, each Segment Length is 1 byte only. Each of these segments will have same SN for assembling the packet.

LSI=0,LIE=0,SI=01→ First segment received.

LSI=0,LIE=0,SI=11,SO=1→ Second Segment received.

Based on these segment offsets (SO) and eventually receiving the SI=10, the first SDU will get assembled.

Knowing that first SDU is completely assembled, the remaining SDUs will be assembled based on further continuous segment offsets and SI information which will give per SDU information. E.g., —second SDU's first segment information will contain LSI=0, LIE=0, SI=01, SO=1500.

Eventually, the entire SN will be declared as received when LSI=1 and SI=10 and all bytes received.

This scenario also implies that grant being less implies very poor channel and hence very low throughput as well. So processing of handling packets is going to be slightly low. All information to be updated using the LSI, the SI and the SO. This is sufficient for the receiver to understand the processing and understand.

FIG. 15 illustrates a variant of a header structure design 1500 where a length indicator fields are placed next to a packet payload, and when this packet is segmented, it illustrates additional fields required in a segment header, according to an embodiment of the disclosure.

Referring to FIG. 15, this scheme follows NR like segmentation, which means that Header structure has only SI and SO field to be interpreted. Beginning of PDU is considered as SO=0 and follows the same mechanism by adding where the packet was segmented. Segmentation takes place by simply updating the remaining bytes of the packet to be updated. No other special fields are required for this scenario. SI interpretation is same as NR. Only the original PDU packet has to contain the appropriate E fields. Segment Offset for the first SDU length in the Header needs to be known. Additionally, a new field to be indicate whether First SDU Length field exist in the Segment Header can be used. Rest all is managed purely based on the offset.

Figure 16:
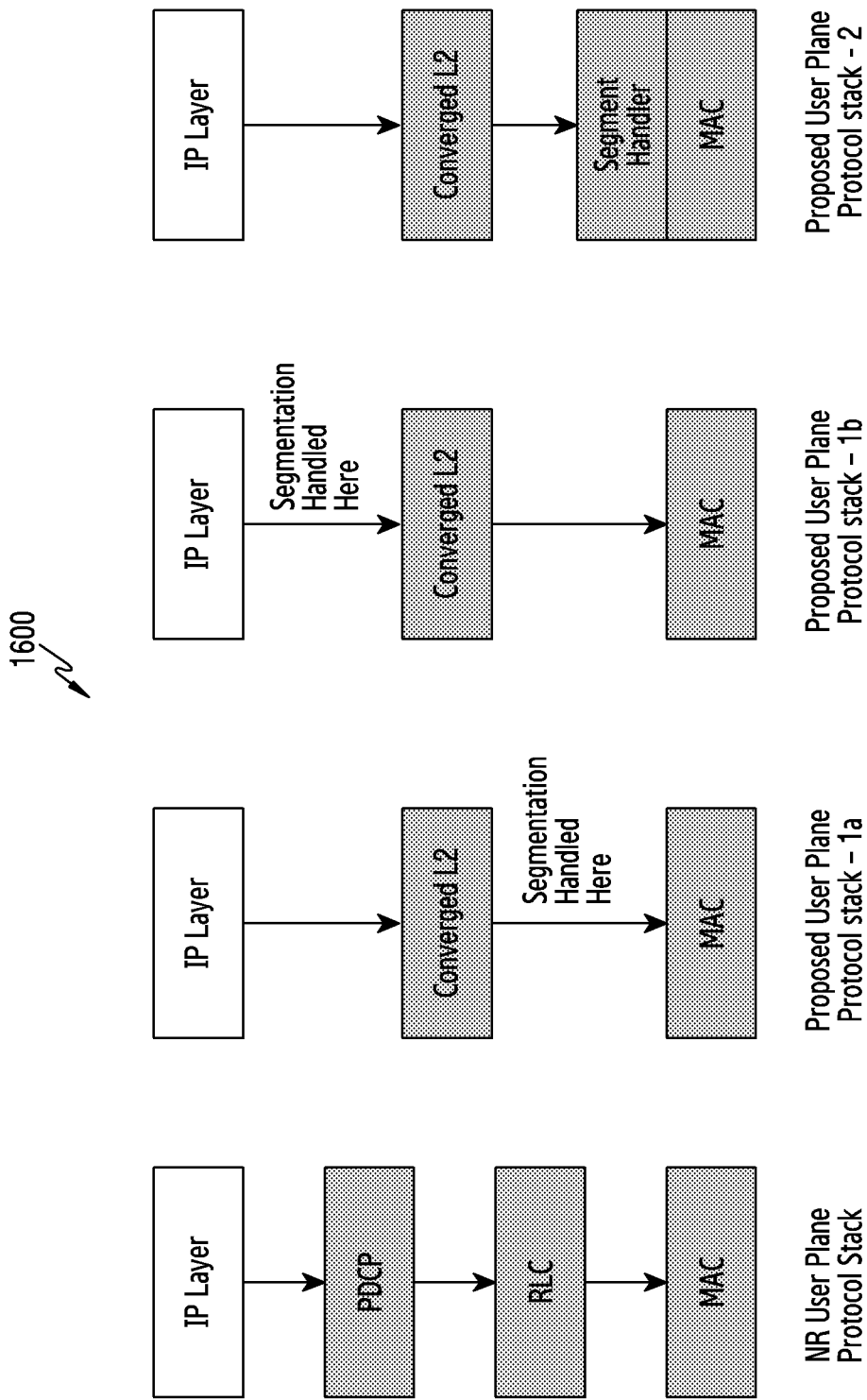
FIG. 16 illustrates a comparison in possible way a segmentation can be handled in terms of functionality at various layers or additionally a new layer can be added according to an embodiment of the disclosure.

FIG. 16 illustrates a comparison 1600 in possible way segmentation can be handled in terms of functionality at various layers or additionally a new layer can be added according to an embodiment of the disclosure.

Referring to FIG. 16, it is further important that the segmentation be handled in the best possible way as in future, it is very likely that the short TTI boundaries for higher frequencies will imply that the time to process for packet handling reduces further. This means that the real time processing becomes very strict. It might also get limited by the processing capability thus not all processors might be able to sustain the KPI requirement. Hence a very strict segregation of non-real time and real time processing is a necessity to perform full end to end stack functionality. New network architecture can arise due to such needs, where base band function (BBF) is a network function/module/entity located very near to RU to do all the real time processing. It is very much desirable to handle segmentation at BBF. Thus it is possible that the functionality of segmentation can be handling at Converged L2, or at MAC or a new layer for segment handler above MAC just for segmentation as shown in the FIG. 16.

As per an embodiment of this proposal, like LTE, concatenation itself takes care of packets which are fragmented during packaging. This is very similar to LTE or 4G. Interface for segmentation handling between MAC and L2 is required as L2 will start processing the payload only after grant reception. Since, non-Real time handling of segmentation is not possible, this makes entire L2 processing as Real Time processing.

As per an embodiment of this proposal, segmentation handling at MAC is also possible. In this case, MAC can use the same SN as received from Converged L2 or L2. MAC updates the Converged L2 Segment Header. Most of the practical NR implementation follow this mechanism. The only requirement is to buffer the packet completely at MAC until fully transmitted.

Additionally, a new SN at MAC introducing new SN at MAC is also possible. Defining new state variable at MAC for SN mapping. MAC SN assigned only for the packets that get segmented. Operation require buffering at MAC, t-reassembly timer at MAC receiver 650 and assigning and maintaining the sequence number exactly same as unacknowledged mode (UM) of NR RLC. In this case, when the segments are lost partially or completely, the information need to be conveyed to L2 layer appropriately with L2 SN, offset of loss, so that L2 triggers ARQ mechanism for recovery.

As per another embodiment of this proposal, a new layer between MAC and L2 (at the BBF) can also be formed. This layer also behaves same as UM operation of NR RLC. The intention is to have a very simple and light reassembly layer sitting on top of MAC and below L2. The layer's functionality is to just assign header and SN for packets that are segmented. Complete PDU can be transferred as it is, which means non-segmented packets are not processed by this layer. This needs buffering of packets at the layer for the case of the segmented packets until the time they are completely transmitted. Additional timer is required at this layer in order to ensure that packets are reassembled after waiting for a certain time duration if not received in order. There is no recovery mechanism at new layer. Additionally, a better interface between New Layer and L2 to ensure lost recovery information for all the segments which were partially lost or completely lost.

Figure 17:
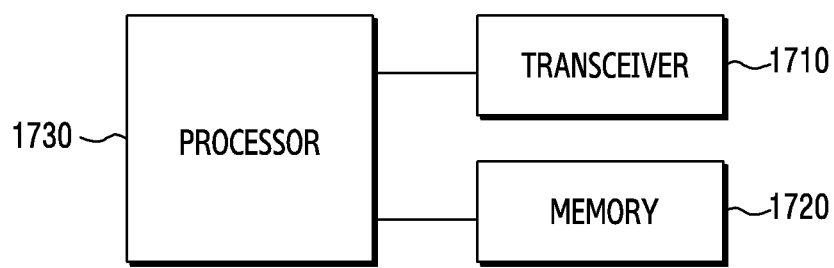
FIG. 17 illustrates a structure of a user equipment (UE) according to embodiments of the disclosure.

FIG. 17 illustrates a structure of a user equipment (UE) according to embodiments of the disclosure.

As shown in FIG. 17, the UE according to an embodiment may include a transceiver 1710, a memory 1720, and a processor 1730. The transceiver 1710, the memory 1720, and the processor 1730 of the UE may operate according to a communication method of the UE described above. However, the components of the UE are not limited thereto. For example, the UE may include more or fewer components than those described above. In addition, the processor 1730, the transceiver 1710, and the memory 1720 may be implemented as a single chip. Also, the processor 1730 may include at least one processor. Furthermore, the UE of FIG. 17 corresponds to the transmitter or the receiver of the FIG. 6.

The transceiver 1710 collectively refers to a UE receiver and a UE transmitter, and may transmit/receive a signal to/from a base station or a network entity. The signal transmitted or received to or from the base station or a network entity may include control information and data. The transceiver 1710 may include a RF transmitter for up-converting and amplifying a frequency of a transmitted signal, and a RF receiver for amplifying low-noise and down-converting a frequency of a received signal. However, this is only an example of the transceiver 1710 and components of the transceiver 1710 are not limited to the RF transmitter and the RF receiver.

Also, the transceiver 1710 may receive and output, to the processor 1730, a signal through a wireless channel, and transmit a signal output from the processor 1730 through the wireless channel.

The memory 1720 may store a program and data required for operations of the UE. Also, the memory 1720 may store control information or data included in a signal obtained by the UE. The memory 1720 may be a storage medium, such as read-only memory (ROM), random access memory (RAM), a hard disk, a CD-ROM, and a DVD, or a combination of storage media.

The processor 1730 may control a series of processes such that the UE operates as described above. For example, the transceiver 1710 may receive a data signal including a control signal transmitted by the base station or the network entity, and the processor 1730 may determine a result of receiving the control signal and the data signal transmitted by the base station or the network entity.

Figure 18:
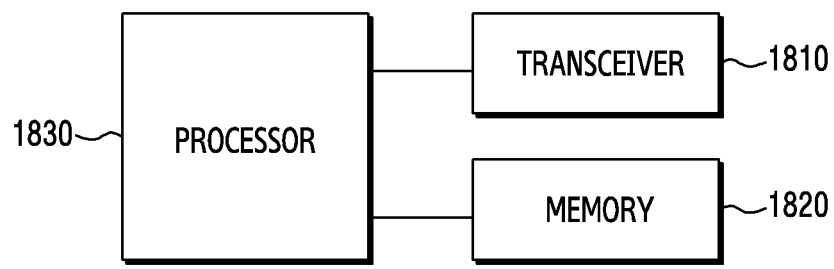
FIG. 18 illustrates a structure of a base station according to an embodiment of the disclosure.

FIG. 18 illustrates a structure of a base station according to an embodiment of the disclosure.

As shown in FIG. 18, the base station according to an embodiment may include a transceiver 1810, a memory 1820, and a processor 1830. The transceiver 1810, the memory 1820, and the processor 1830 of the base station may operate according to a communication method of the base station described above. However, the components of the base station are not limited thereto. For example, the base station may include more or fewer components than those described above. In addition, the processor 1830, the transceiver 1810, and the memory 1820 may be implemented as a single chip. Also, the processor 1830 may include at least one processor. Furthermore, the base station of FIG. 18 corresponds to the transmitter or the receiver of the FIG. 6.

The transceiver 1810 collectively refers to a base station receiver and a base station transmitter, and may transmit/receive a signal to/from a terminal (UE) or a network entity. The signal transmitted or received to or from the terminal or a network entity may include control information and data. The transceiver 1810 may include a RF transmitter for up-converting and amplifying a frequency of a transmitted signal, and a RF receiver for amplifying low-noise and down-converting a frequency of a received signal. However, this is only an example of the transceiver 1810 and components of the transceiver 1810 are not limited to the RF transmitter and the RF receiver.

Also, the transceiver 1810 may receive and output, to the processor 1830, a signal through a wireless channel, and transmit a signal output from the processor 1830 through the wireless channel.

The memory 1820 may store a program and data required for operations of the base station. Also, the memory 1820 may store control information or data included in a signal obtained by the base station. The memory 1820 may be a storage medium, such as read-only memory (ROM), random access memory (RAM), a hard disk, a CD-ROM, and a DVD, or a combination of storage media.

The processor 1830 may control a series of processes such that the base station operates as described above. For example, the transceiver 1810 may receive a data signal including a control signal transmitted by the terminal, and the processor 1830 may determine a result of receiving the control signal and the data signal transmitted by the terminal.

Thus, with the aforementioned multiple variants of header structure and the proposed locations at which the processing can be processed, this proposal tries to simplify much of processing.

While specific language has been used to describe the disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The various actions, acts, blocks, steps, or the like in the flowchart S700 may be performed in the order presented, in a different order or simultaneously. Further, in some embodiments of the disclosure, some of the actions, acts, blocks, steps, or the like may be omitted, added, modified, skipped, or the like without departing from the scope of the disclosure.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

It will be appreciated that various embodiments of the disclosure according to the claims and description in the specification can be realized in the form of hardware, software or a combination of hardware and software.

Any such software may be stored in a non-transitory computer readable storage medium. The non-transitory computer readable storage medium stores one or more computer programs (software modules), the one or more computer programs comprising instructions, which when executed by one or more processors in an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a transmitter in a wireless communication system, the method comprising:
   receiving, from an upper layer by a converged layer 2 (L2) of the transmitter, a plurality of service data units (SDUs);
   concatenating, by the converged L2, the plurality of SDUs to form a complete protocol data unit (PDU);
   assigning, by the converged L2, a L2 sequence number (SN) to the complete PDU, wherein the L2 SN includes at least one of a last SDU indicator (LSI) indicating a presence of a last SDU of the complete PDU, a length indicator exist (LIE) indicating a presence of a length indicator (LI) after a L2 header, or a segment indication (SI) indicating a segmentation status or stage of the complete PDU;
   receiving, by a medium access control (MAC) layer, a grant opportunity or a transmission opportunity for the complete PDU; and
   transmitting, to a lower layer by the MAC layer, the complete PDU with or without segmentation based on the grant opportunity or the transmission opportunity.

2. The method of claim 1, wherein the transmitting of the complete PDU comprises:
   determining, by the MAC layer, whether the grant opportunity or the transmission opportunity is enough to send a complete PDU;
   in case that the grant opportunity or the transmission opportunity is enough to send the complete PDU, transmitting the complete PDU to the lower layer without segmentation; and
   in case that the grant opportunity or the transmission opportunity is not enough to send the complete PDU, segmenting the complete PDU into a plurality of PDU segments and transmitting the plurality of PDU segments to the lower layer.

3. The method of claim 2, wherein the transmitting of the plurality of PDU segments comprises:
   generating, by the MAC layer, a segment header for each PDU segment of the plurality of PDU segments based on the grant opportunity or the transmission opportunity;
   assigning, by the MAC layer, an identifier field with a same L2 SN to each PDU segment in the segment header,
      wherein the L2 SN includes a segmentation offset (SO) field, and
      wherein the SO field indicates offset from a first byte of a payload,
   generating, by the MAC layer, a MAC PDU by assigning a MAC sub header to the plurality of PDU segments of the complete PDU; and
   transmitting, to the lower layer by the MAC layer, the MAC PDU.

4. The method of claim 3, wherein the transmitting of the MAC PDU comprises:
   determining, by the MAC layer, whether the grant opportunity or the transmission opportunity is enough to transmit an original LI in transmission time intervals (TTIs);
   in case that the grant opportunity or the transmission opportunity is enough to transmit the original LI in subsequent TTIs, transmitting the original LI in all payloads of the PDU segments of the MAC PDU in the subsequent TTIs; and
   in case that the grant opportunity or the transmission opportunity is not enough to transmit the original LI in the subsequent TTIs, transmitting a truncated LI only for a portion of an SDU which is present in the PDU segments of the MAC PDU after segmentation.

5. The method of claim 3, wherein, in case that the identifier field for the PDU segments in a same L2 Header, the same L2 SN is assigned for all the PDU segments of the complete PDU.

6. The method of claim 2, wherein the transmitting of the complete PDU without segmentation comprises:
   generating, by the MAC layer, a MAC PDU by assigning a SI indicating that the complete PDU is not segmented, an LSI indicating that the complete PDU includes the last SDU which was concatenated to form by the completed PDU at the converged L2, and a LIE indicating a presence of a length Indicator as a L2 Sub Header including an LI field for the plurality of SDUs; and
   transmitting, by the MAC layer, the MAC PDU to the lower layer of the transmitter for transmission to a receiver.

7. The method of claim 1, wherein the LSI is set high when the SI indicates the last SDU of the complete PDU.

8. The method of claim 1, wherein the LIE is set high when the LI exist following the L2 Header.

9. The method of claim 1,
   wherein the concatenation of the plurality of SDUs is done in non-real time (NTR), and wherein the segmentation is performed in real time (RT) by a layer between the converged L2 and the MAC layer or by a MAC layer using same SN as a packet at converged Layer 2 or a new identifier at MAC layer or a new layer between the converged L2 and MAC layer.

10. A transmitter comprising:
at least one transceiver;
at least one processor communicatively coupled to the at least one transceiver; and
at least one memory, communicatively coupled to the at least one processor, storing instructions executable by the at least one processor individually or in any combination to cause the transmitter to:
receive, from an upper layer by a converged layer 2 (L2) of the transmitter, a plurality of service data units (SDUs),
concatenate the plurality of SDUs to form a complete protocol data unit (PDU) using the converged L2,
assign a L2 sequence number (SN) to the complete PDU using the converged L2 of the transmitter, wherein the L2 SN includes at least one of a last SDU indicator (LSI) indicating a presence of a last SDU of the complete PDU, a length indicator exist (LIE) indicating a presence of a length indicator (LI) after a L2 header, or a segment indication (SI) indicating a segmentation status or stage of the complete PDU,
receive a grant opportunity or a transmission opportunity for the complete PDU using a medium access control (MAC) layer, and
transmit, to a lower layer, the complete PDU with or without segmentation based on the grant opportunity or the transmission opportunity using the MAC layer.

11. The transmitter of claim 10, wherein the instructions further cause the transmitter to:
determine whether the grant opportunity or the transmission opportunity is enough to transmit a complete PDU using the MAC layer;
in case that the grant opportunity or the transmission opportunity is enough to send the complete PDU, transmit the complete PDU to the lower layer without segmentation; and
in case that the grant opportunity or the transmission opportunity is not enough to send the complete PDU, segment the complete PDU into a plurality of PDU segments and transmit the plurality of PDU segments to the lower layer.

12. The transmitter of claim 11, wherein the instructions further cause the transmitter to:
generate a segment header for each PDU segment of the plurality of PDU segments based on the grant opportunity or the transmission opportunity using the MAC layer,
assign an identifier field with a same L2 SN to each PDU segment in the segment header using the MAC layer, wherein the L2 SN includes a segmentation offset (SO) field, and wherein the SO field indicates offset from a first byte of a payload,
generate a MAC PDU by assigning a MAC sub header to the plurality of PDU segments of the complete PDU using the MAC layer, and
transmit, to the lower layer, the MAC PDU using the MAC layer.

13. The transmitter of claim 12, wherein the instructions further cause the transmitter to:

determine whether the grant opportunity or the transmission opportunity is enough to transmit an original LI in transmission time intervals (TTIs) using the MAC layer;
in case that the grant opportunity or the transmission opportunity is enough to transmit the original LI in subsequent TTIs, transmit the original LI in all payloads of the PDU segments of the MAC PDU in the subsequent TTIs; and
in case that the grant opportunity or the transmission opportunity is not enough to transmit the original LI in the subsequent TTIs, transmit a truncated LI only for a portion of an SDU which is present in the PDU segments of the MAC PDU after segmentation.

14. The transmitter of claim 12, wherein, in case that the identifier field for the PDU segments in a same L2 Header, the same L2 SN is assigned for all the PDU segments of the complete PDU.

15. The transmitter of claim 11, wherein the instructions further cause the transmitter to:
generate a MAC PDU by assigning a SI indicating that the complete PDU is not segmented, an LSI indicating that the complete PDU includes
the last SDU which was concatenated to form by the completed PDU at the converged L2, or
a LIE indicating a presence of a length Indicator as a L2 Sub Header including an LI field for the plurality of SDUs using the MAC layer; and
transmit the MAC PDU to the lower layer for transmission to a receiver using the MAC layer.

16. The transmitter of claim 10, wherein the LSI is set high when the SI indicates the last SDU of the complete PDU.

17. The transmitter of claim 10, wherein the LIE is set high when the LI exist following the L2 Header.

18. The transmitter of claim 10,
wherein the concatenation of the plurality of SDUs is done in non-real time (NTR), and
wherein the segmentation is performed in real time (RT) by a layer between the converged L2 and the MAC layer or by a MAC layer using same SN as a packet at converged Layer 2 or a new identifier at MAC layer or a new layer between the converged L2 and MAC layer.

19. One or more non-transitory computer-readable storage media storing computer-executable instructions that, when executed by at least one processor of a transmitter individually or collectively, cause the transmitter to perform operations, the operations comprising:
receiving, from an upper layer by a converged layer 2 (L2), a plurality of service data units (SDUs);
concatenating, by the converged L2, the plurality of SDUs to form a complete protocol data unit (PDU);
assigning, by the converged L2, a L2 sequence number (SN) to the complete PDU, wherein the L2 SN includes at least one of a last SDU indicator (LSI) indicating a presence of a last SDU of the complete PDU, a length indicator exist (LIE) indicating a presence of a length indicator (LI) after a L2 header, or a segment indication (SI) indicating a segmentation status or stage of the complete PDU;
receiving, by a medium access control (MAC) layer, a grant opportunity or a transmission opportunity for the complete PDU; and
transmitting, to a lower layer by the MAC layer, the complete PDU with or without segmentation based on the grant opportunity or the transmission opportunity.

20. The one or more non-transitory computer-readable storage media of claim 19, wherein the transmitting of the complete PDU comprises:
- determining, by the MAC layer, whether the grant opportunity or the transmission opportunity is enough to transmit a complete PDU; and
- in case that the grant opportunity or the transmission opportunity is enough to send the complete PDU, transmitting the complete PDU to the lower layer without segmentation; and
- in case that the grant opportunity or the transmission opportunity is not enough to send the complete PDU, segmenting the complete PDU into a plurality of PDU segments and transmitting the plurality of PDU segments to the lower layer.

* * * * *